United States Patent
Peed

(10) Patent No.: US 10,006,434 B1
(45) Date of Patent: Jun. 26, 2018

(54) SYSTEM AND METHOD FOR CONVERTING ENERGY FROM WATER WAVES

(71) Applicant: David Lee Peed, Dahlonega, GA (US)

(72) Inventor: David Lee Peed, Dahlonega, GA (US)

( * ) Notice: Subject to any disclaimer, the term of this patent is extended or adjusted under 35 U.S.C. 154(b) by 331 days.

(21) Appl. No.: 14/796,093

(22) Filed: Jul. 10, 2015

(51) Int. Cl.
| F03B 13/14 | (2006.01) |
| F03B 13/10 | (2006.01) |
| F03B 3/14 | (2006.01) |
| F03B 13/18 | (2006.01) |

(52) U.S. Cl.
CPC .............. *F03B 3/145* (2013.01); *F03B 13/10* (2013.01); *F03B 13/14* (2013.01); *F03B 13/185* (2013.01); *Y02E 10/28* (2013.01); *Y02E 10/38* (2013.01)

(58) Field of Classification Search
CPC .. F03B 7/006; F03B 9/00; F03B 13/12; F03B 13/14; F03B 13/16; F03B 13/18; F03B 13/1835; F03B 13/184; F03B 13/186; F03B 13/22; F03B 17/062; F03B 17/063; Y02E 10/38; Y02E 10/28; Y02E 10/223
USPC .................................. 290/53, 54; 416/7, 17
See application file for complete search history.

(56) References Cited

U.S. PATENT DOCUMENTS

| 195,114 | A | * | 9/1877 | Folsom | F03B 17/065 415/141 |
| 1,741,949 | A | * | 12/1929 | Nagy | F03B 17/065 416/238 |
| 3,928,771 | A | * | 12/1975 | Straumsnes | F03B 17/065 290/43 |
| 3,973,864 | A | * | 8/1976 | Atherton | F03B 13/184 415/140 |
| 4,078,871 | A | * | 3/1978 | Perkins, Jr. | F03B 13/147 290/53 |
| 4,301,377 | A | * | 11/1981 | Rydz | F03B 17/063 290/43 |
| 4,352,990 | A | * | 10/1982 | Aucoin, Jr. | F03B 17/064 290/54 |
| 4,446,378 | A | * | 5/1984 | Martinez Parra | F03B 13/145 290/54 |
| 4,516,033 | A | * | 5/1985 | Olson | F03B 17/062 290/42 |
| 5,051,059 | A | * | 9/1991 | Rademacher | F03B 17/062 415/3.1 |
| 5,136,174 | A | * | 8/1992 | Simoni | F03B 17/062 290/43 |
| 6,809,430 | B2 | * | 10/2004 | Diederich | F03B 17/066 290/54 |
| 8,102,069 | B2 | * | 1/2012 | Steelman | F03B 17/066 290/44 |
| 8,253,264 | B2 | * | 8/2012 | Becker | F03D 5/02 290/44 |

(Continued)

*Primary Examiner* — Ruth Ilan

(57) ABSTRACT

A system and method of extracting the rotational energy of water waves and converting this energy into the rotating torque of a drive axle. This system and method incorporates the use of a wave amplification channel using an array of one way valves surrounding a wave energy collection mechanism (WECM). The WECM is a conveyor, using hinged, curved paddled wave wheels attached to a pinion and rack system causing the waves to drive the conveyor. The WECM is supported by two movable connected walls. These walls are either structure-mounted or ship-mounted with a permanent anchoring system. Two possible ways of automating the conveyer to accommodate variations in wave period are also given.

7 Claims, 23 Drawing Sheets

(56) References Cited

U.S. PATENT DOCUMENTS

| | | | |
|---|---|---|---|
| 8,534,057 B1* | 9/2013 | Brown | F03B 17/068 290/54 |
| 2006/0119107 A1* | 6/2006 | Coman | F03B 17/063 290/54 |
| 2008/0093852 A1* | 4/2008 | Vowles | F03B 13/14 290/42 |
| 2008/0231057 A1* | 9/2008 | Zeuner | F03B 17/065 290/54 |
| 2008/0304968 A1* | 12/2008 | Fite | F03B 17/065 416/140 |
| 2009/0174190 A1* | 7/2009 | Carter | F03B 13/22 290/53 |
| 2010/0058754 A1* | 3/2010 | Fong | F03B 13/1815 60/506 |
| 2012/0119501 A1* | 5/2012 | Yeomans | F03B 13/264 290/54 |
| 2012/0169056 A1* | 7/2012 | Peed | F03B 17/068 290/53 |
| 2013/0221672 A1* | 8/2013 | Costas | F03B 13/22 290/53 |
| 2014/0044521 A1* | 2/2014 | Bae | F03B 17/063 415/7 |
| 2014/0159366 A1* | 6/2014 | Figueroa Nunez | F03B 17/063 290/43 |
| 2015/0252776 A1* | 9/2015 | Van Rompay | F03B 17/063 290/54 |

\* cited by examiner

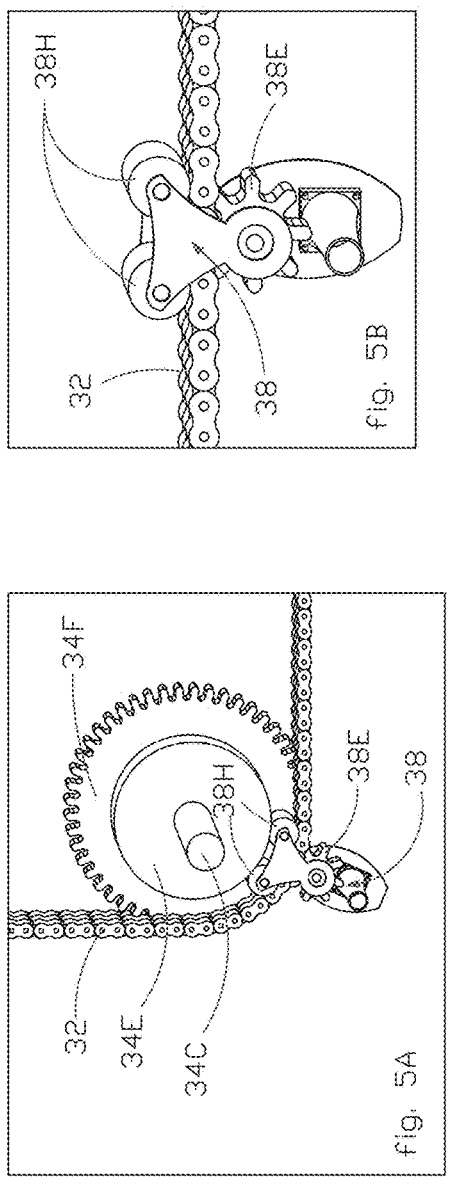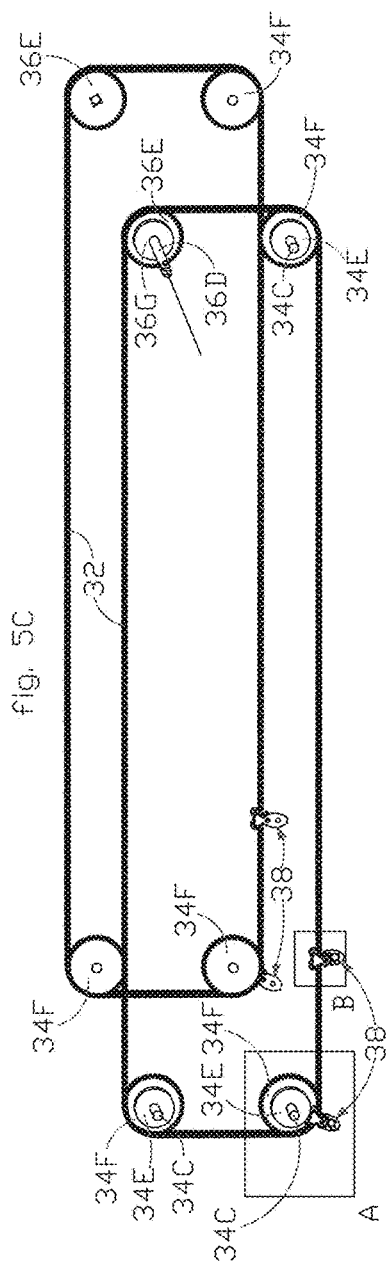
Fig. 5

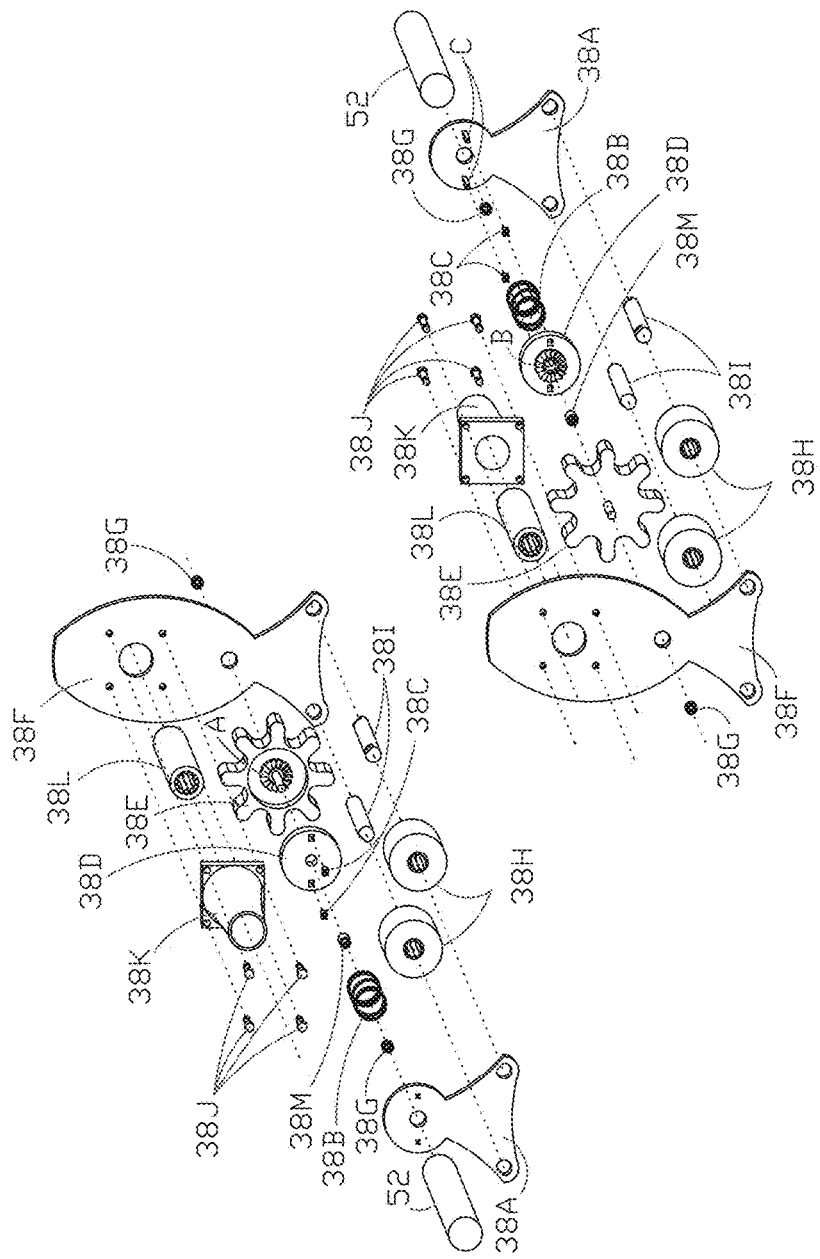

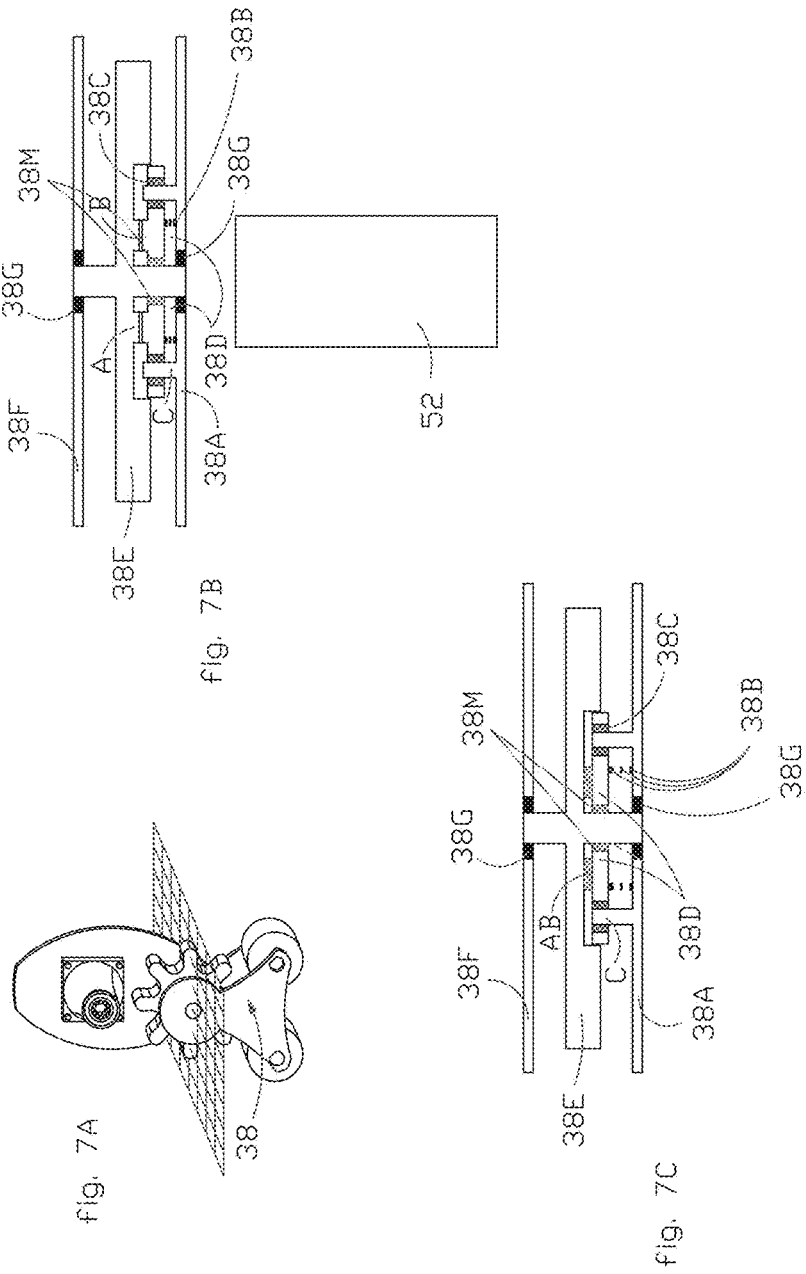

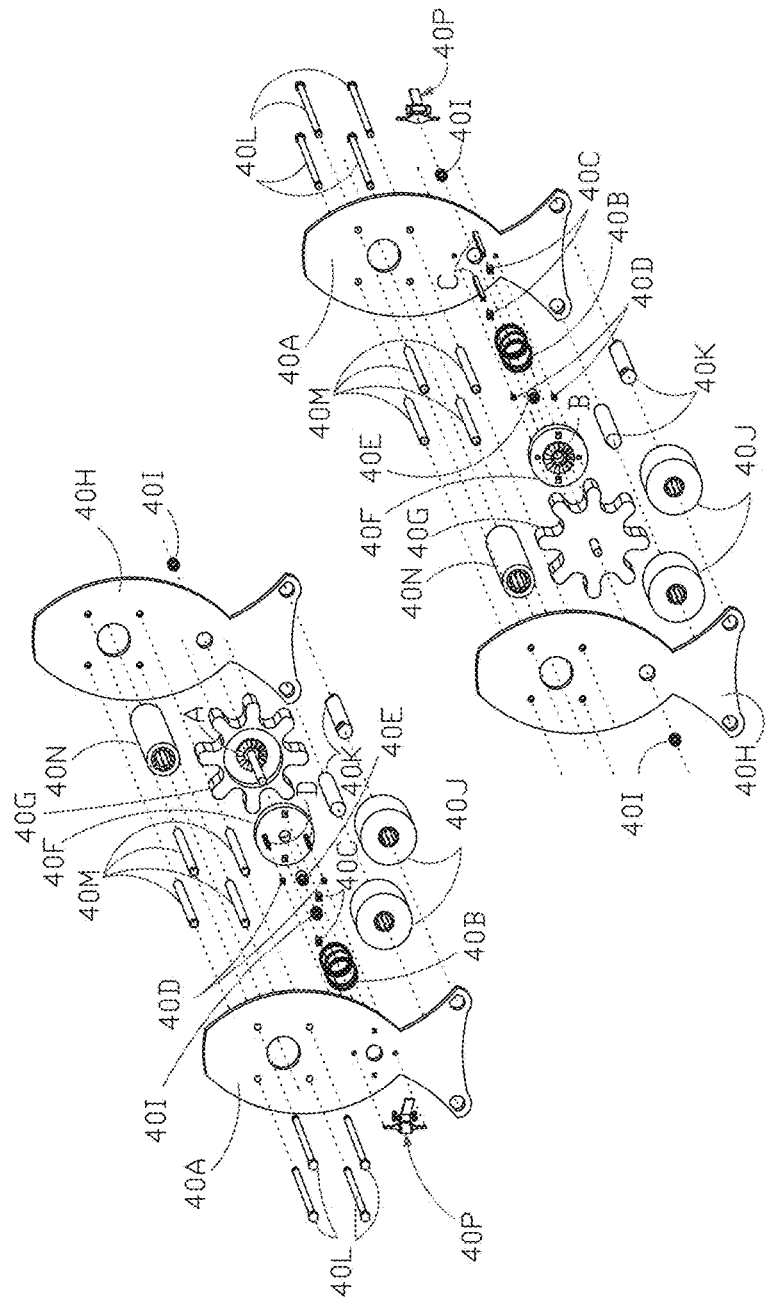

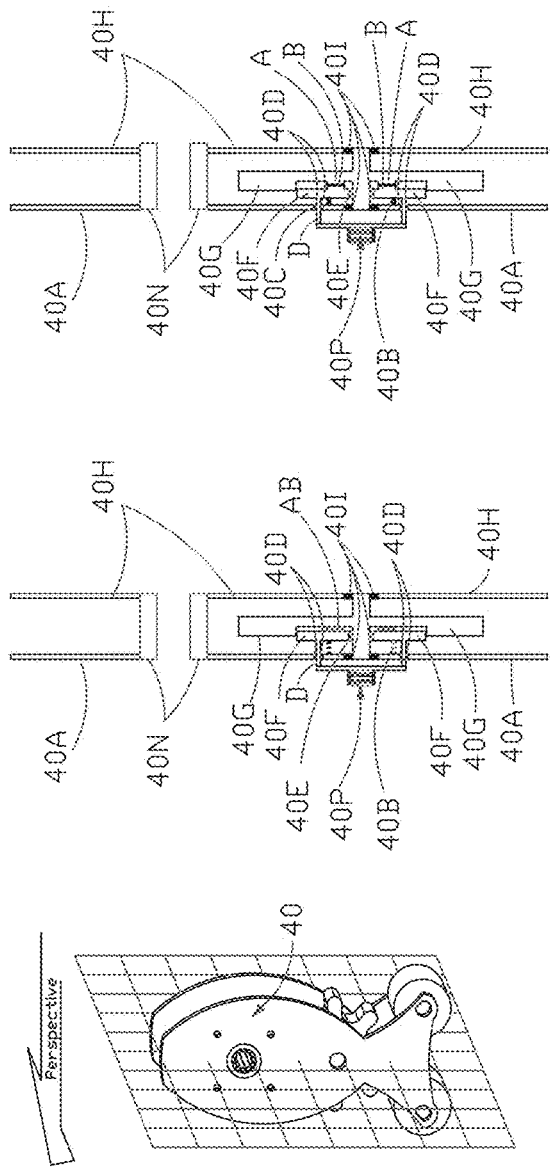

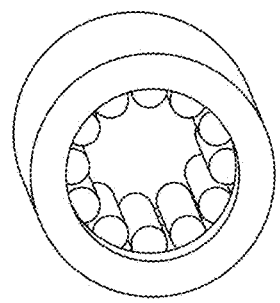
fig. 10A
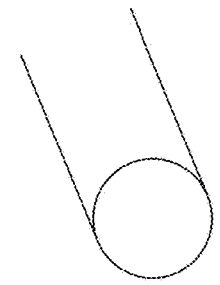
fig. 10B
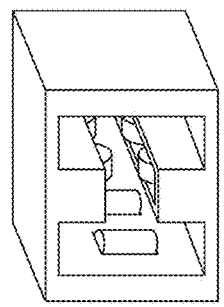
fig. 10C
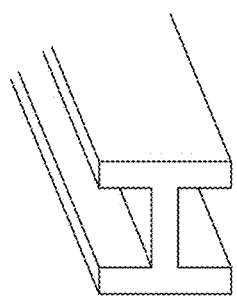
fig. 10D
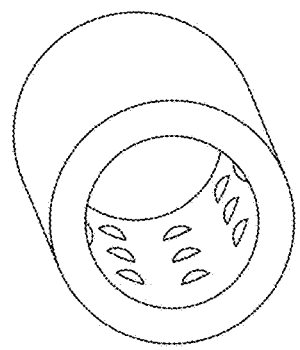
fig. 10E
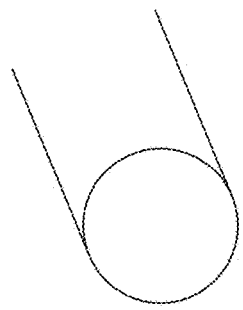
fig. 10F
Fig. 10

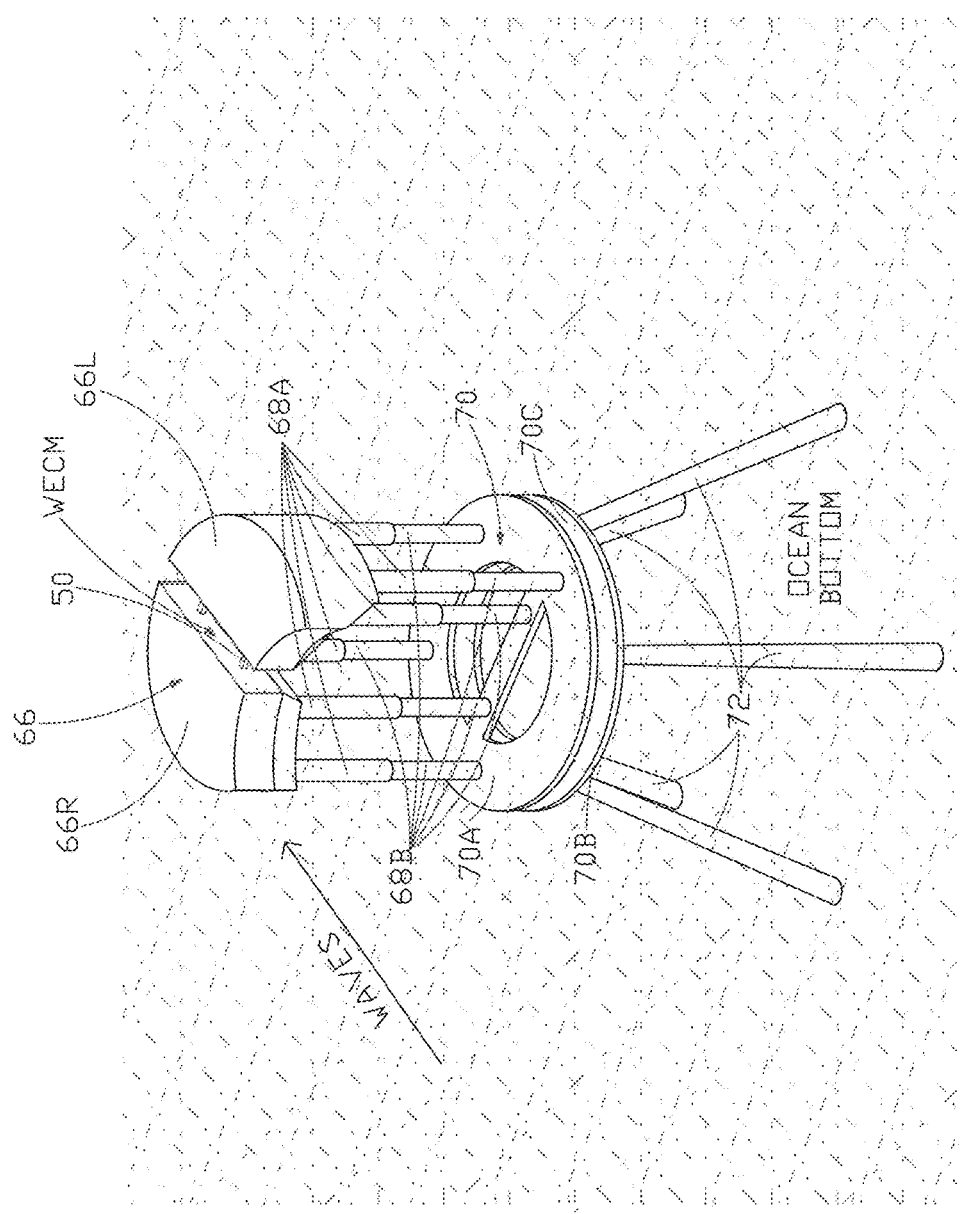

SYSTEM AND METHOD FOR CONVERTING ENERGY FROM WATER WAVES

TECHNICAL FIELD

This collection of ideas relate generally to the field of energy conversion, and more specifically to a system and method for converting the rotational fluid motion of water waves into the useable mechanical rotation of a drive axle. A flywheel, torque converter, transmission, along with other commonly used technologies, could be utilized to create the necessary consistent torque and angular velocity to drive electric generators. The torque of the rotating drive axle could also be put to more direct mechanical use; to drive a pump for example.

BACKGROUND

The technical field of harnessing the power of water waves has had many unique innovations, especially in recent years. As an inventor in this field I have researched these new innovations by others and have even had a professional patent search conducted. Most of these ideas differ substantially from my own. Even the most similar of these inventions claimed by others differ from my own in ways that I intend to claim in several non-provisional patent applications that I intend to compose to follow and refer back to this document. Some of my ideas will be detailed in the embodiment that follows.

SUMMARY

Both the rotational and transitional motion of water waves have been taken into account in these embodiments. The rotational energy of water waves is first harnessed mechanically by a specially designed paddle wheel called a wave spool. Each wave spool includes a pair of circular gears that mesh with a pair of stationary rack gears to drive a conveyer. This method of having the rotational energy of water waves converted into transitional motion of machinery to drive a conveyer allows each wave spool to move with the wave transitionally to collect more energy from the wave over time. The conveyer will include at least one drive axle from which the energy extracted from the waves can be harnessed for a usable purpose.

Ideas for automation to time the conveyance of wave spools to match variations in wave period are also included in this embodiment. Two types of sprocket idle-lock mechanisms are explained in this embodiment. One sprocket idle-lock mechanism (SILM) uses magnets and the other SILM is mechanically triggered. Automation may prove to be an accessory worth adding to the already functional non-automated device. The ideas presented in the SILMs may be of use in otherwise unrelated industrial innovations involving conveyers outside the scope of wave energy conversion.

This embodiment also introduces a wave enhancement channel that will consist of an array of one way valves housed within an underwater surface. This channel will be below and at the sides of the conveyer and will be open at the front and back. The conveyer will be referred to in this document as the wave energy conveyer mechanism or WECM. Although it has been added as an accessory to an already completely functional energy converter, this wave amplification channel may prove to greatly enhance the usefulness of not only this device but also the past and future inventions of others in the field of water wave energy conversion.

The WECM may be supported by a multiply anchored double hulled vessel or rigidly supported to the bottom of the body of water. In either case the WECM will be equipped with movable walls allowing it to be lifted out of the water for transport or maintenance.

The invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 5 introduces the conveyor system or wave energy conveyer mechanism (WECM).

FIG. 6 shows two exploded, isometric views of a magnetic sprocket idle-lock mechanism (SILM) 38.

FIG. 7 shows two cutaway views of a magnetic sprocket idle-lock mechanism (SILM) 38.

FIG. 8 is two exploded isometric views of a mechanically levered sprocket idle-lock mechanism (SILM) 40.

FIG. 9 shows two cutaway views of a mechanically levered sprocket idle-lock mechanism (SILM) 40.

FIG. 10 is a close up view of 3 types of bearings used in both the idle-lock sprocket mechanisms (SILMs) 38, 40.

FIG. 23 shows an alternative bottom supported housing 66 to the support walls 50L and 50R of the conveyor system.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

These ideas relate to a system and method for converting the rotational mechanical energy of water waves into useable mechanical and/or electrical power.

PART NUMBER INDEX FOR FIG. 1

Figure 1:
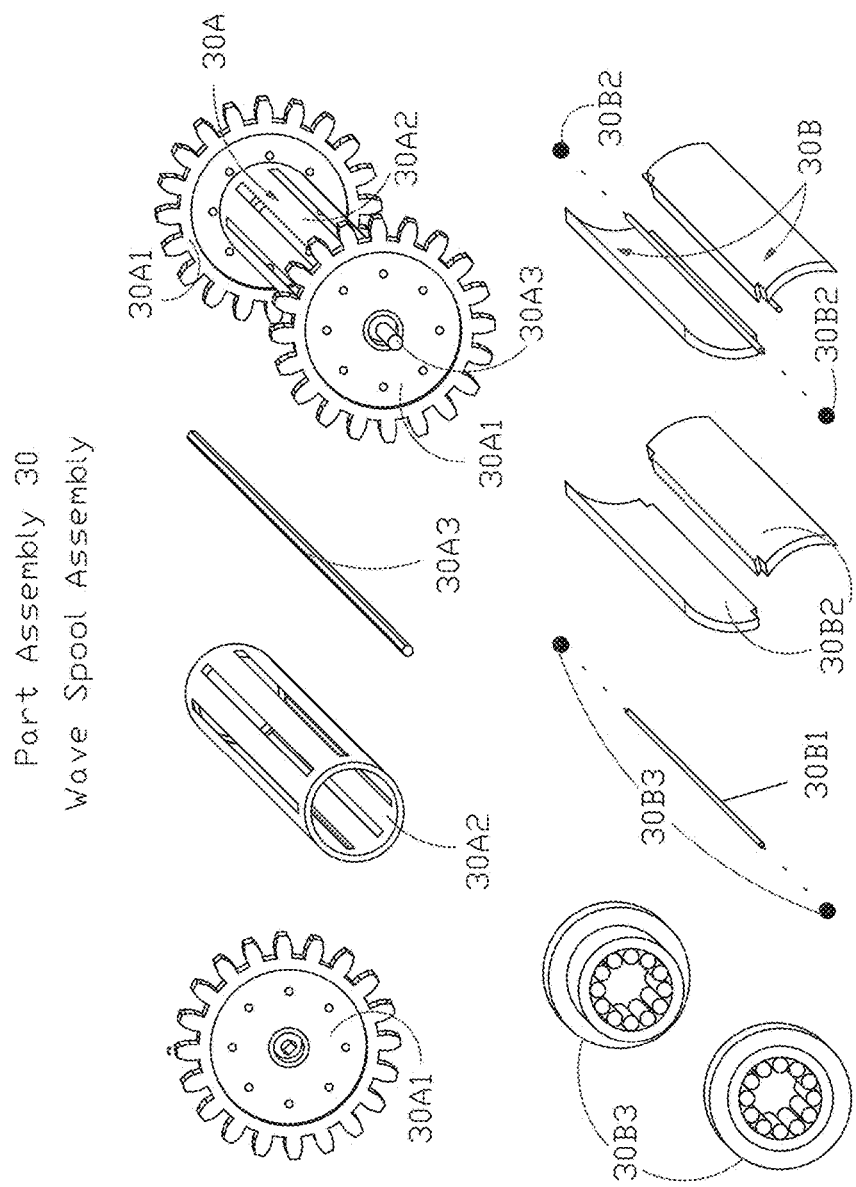
FIG. 1 shows the parts of a wave spool assembly 30.

30 wave spool assembly
30A wave spool core assembly
30A1 wave spool gear-endplate
30A2 slotted cylindrical tube
30A3 wave spool central axle
30B wave spool paddle with axle
30B1 wave spool paddle axle
30B2 wave spool paddle
30B3 wave spool paddle axle bearings The wave spools 30 are the part assemblies that capture the rotational mechanical energy of water waves. The individual parts of a wave spool assembly are shown in FIG. 1. 30A1 serves as both a gear and an endplate. Two of these gears 30A1 are attached to each end of a slotted cylindrical tube 30A2 to form the core of the wave spool 30A. Since there will be no relative motion between the gear-endplates 30A1 and the slotted cylindrical tube 30A2, they could be made, casted, molded, formed or otherwise permanently attached as a single part. The gear-endplates 30A1 have holes to accommodate bearings 30B3, central axle 30A3 and paddle axles 30B1. The central axle of rotation 30A3 will be non-movably attached to the gear-endplates 30A1 such that 30A1, 30A2 and 30A3 are one rigid part; the wave spool core 30A. The other holes that are placed radially around the central hole of the gear-endplates 30A1 will house bearings 30B3 for the paddle axles 30B1. Each paddle axle 30B1 will be permanently attached to its respective paddle 30B2 to create one rigid part 30B. The slots shown in 30A2 in FIG. 1. will stop the relative motion of 30B and 30A once the outside edge of the paddle 30B2 has been moved to a maximum distance from the central axle of rotation 30A3. These slots in 30A2 will also allow water to drain from 30A2 when each wave spool 30 surfaces from the water.

PART NUMBER INDEX FOR FIG. 2

Figure 2:
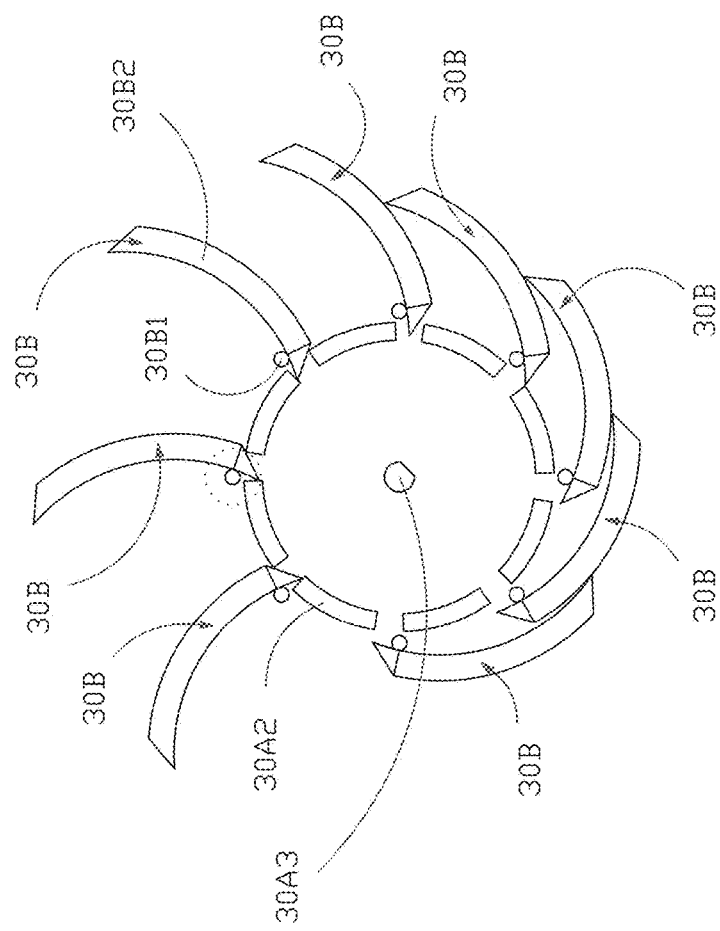
FIG. 2 is a cut away horizontal view of a wave spool assembly 30 being rotated by a wave.

30A2 slotted cylindrical tube
30A3 wave spool central axle
30B wave spool paddle and axle
30B1 wave spool paddle axle
30B2 wave spool paddle FIG. 2 is a cross sectional view of a wave spool 30. The paddles 30B are positioned as they might be if the wave spool 30 is submerged inside of, and traveling with, a water wave. The water wave would be moving transitionally from left to the right of FIG. 2. As the wave spool 30 moves transitionally along with the wave from left to right, the rotational flow of the water will pass over the wave spool 30 in a clockwise direction. This flow of water will cause a torque turning the wave spool 30 in a clockwise direction. Once the flow of water has opened each paddle 30B to its maximum position, it is locked into this position by the slots in 30A2. When the drag of the water opposite to the direction of rotation exceeds the rotational motion in the intended direction of rotation, the paddle 30B will close against the other paddles 30B and spool 30A2. This will minimize friction in the clockwise direction. The design of the wave spool 30 maximizes torque in the intended direction and minimizes friction against the desired direction of rotation.

PART NUMBER INDEX FOR FIG. 3

30 wave spool assembly
30A wave spool core
30B wave spool paddle and axle

Figure 3:
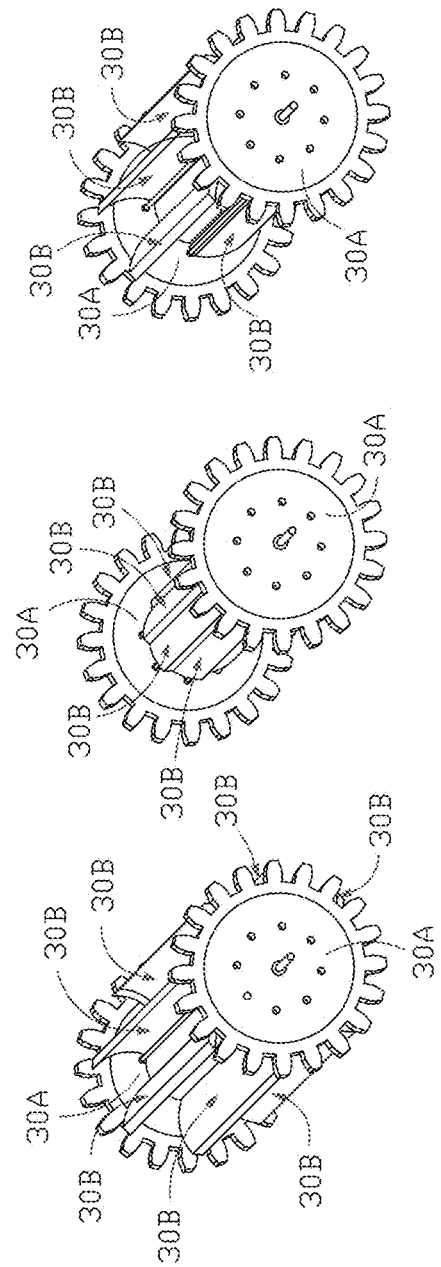
FIG. 3 demonstrates how a wave spool 30 is affected by the relative motion of surrounding water.

FIG. 3 shows the response of a wave spool 30 in three different situations. FIG. 3A is the response of a wave spool 30 being rotated counter-clockwise in still water. This causes all paddles 30B to open to maximum leverage positions. Of course water flowing clockwise around the wave wheel 30 would result in the opening of all of the paddles 30B to a maximum leverage position also. FIG. 3B shows the response of a wave spool 30 being rotated clockwise submerged in still water. From the perspective of FIG. 3, rotation in a counter-clockwise direction in still water will have a maximum of resistance (FIG. 3A) and a clockwise rotation will have a minimum resistance (FIG. 3B). FIG. 3B would also show the reaction of the wave spool 30 to water flowing all the way around it in a counter-clockwise direction. FIG. 3A and FIG. 3C both show how the wave spool 30 could respond to being inside of a moving water wave. The longer the wave spool 30 remains inside the wave, the more energy can be harnessed from the wave. If the wave spool 30 can be made to follow and stay within the wave as it travels transitionally, more energy can be taken from the wave.

PART NUMBER INDEX FOR FIG. 4

Figure 4:
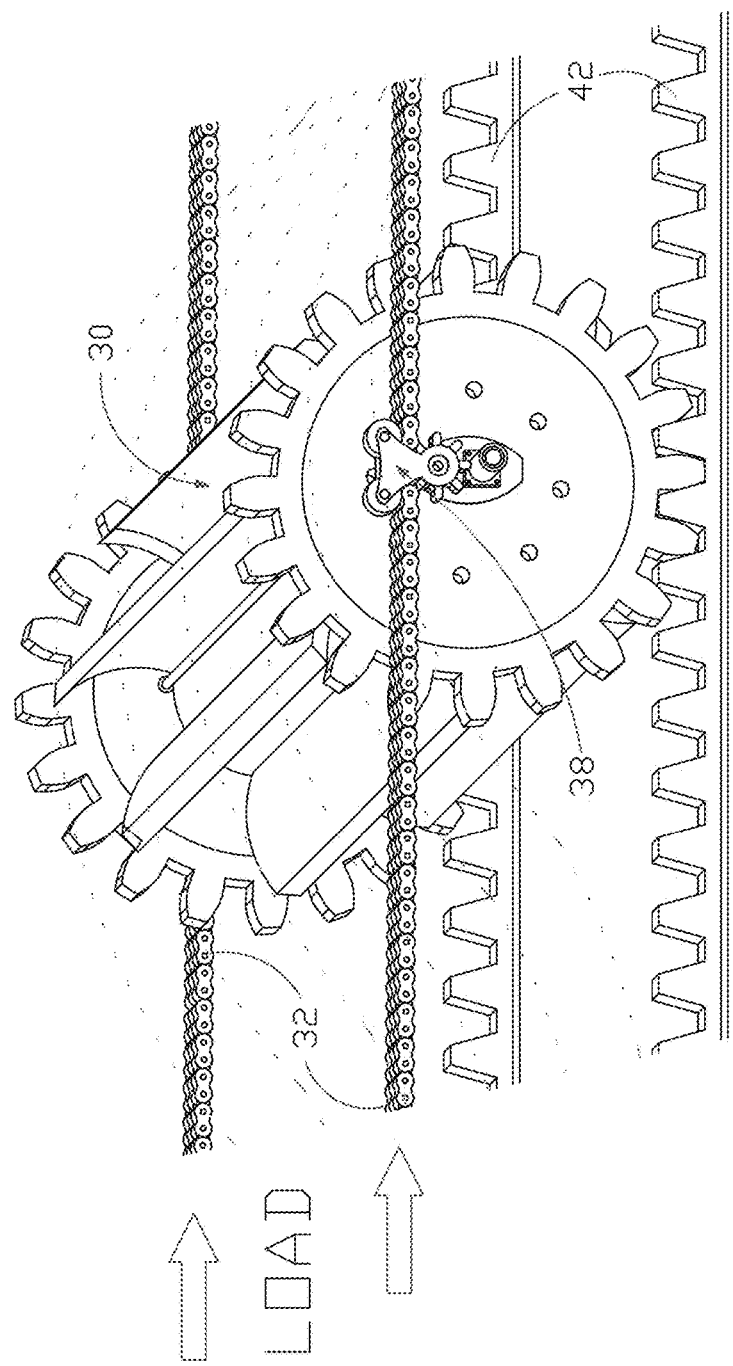
FIG. 4 shows how the rotational energy of a wave is captured and converted into transitional motion to pull a load on a pair of duplex chains 32.

30 wave spool assembly
32 duplex roller chains
38 magnetic sprocket idle-lock mechanisms
42 rack gears FIG. 4 introduces several parts to the embodiment. If the two spur gear-endplates 30A of the wave spool assembly 30 are engaged with a pair of supported rack gears 42, the rotation of the wave spool 30 caused by the wave is converted into forward mechanical motion of the wave spool assembly 30. The central axle 30A3 of each wave spool 30 will be rotatably attached to a pair of sprocket idle-lock mechanisms 38. The sprocket idle-lock mechanism (SILM) 38 shown in FIG. 4 is of the magnetic type and is covered in more detail in FIG. 5, FIG. 6 and FIG. 7. The need for an attachment of the wave spool assembly 30 to the pair of duplex roller chains 32 can also be filled by a mechanically levered sprocket idle-lock mechanism 40. The mechanically levered SILM 40 will be covered in detail accompanied by FIG. 8 though FIG. 12. Either type of SILM, 38 or 40 could be used to function in place of one another. Each pair of sprocket idle-lock mechanisms 38 (in FIG. 4) will be attached to a pair of duplex roller chains 32. The forward motion, from left to right in FIG. 4, of the wave spool 30 is transferred by the SILM 38 to pull a load on the duplex roller chains 32. The concept just described has proven to work experimentally.

PART NUMBER INDEX FOR FIG. 5

32 duplex roller chains
34C idler axle
34E idler roller
34F idler sprocket
36D inside part of drive axle
36E drive sprocket
36G drive roller
38 magnetic sprocket idle-lock mechanisms (SILMs)

The pair of duplex roller chains 32, supported by a set of sprockets 34F and 36E, rollers 34E and 36G, idler axles 34C and part of a drive axle 36D, are shown in FIG. 5. With other parts added, the pair of duplex roller chains 32 will be moved as a conveyer by the water waves in a counter-clockwise direction. This conveyer system will be referred to as the wave energy conveyer system or WECM. Parts 34C, 34E and 34F are parts of the idler axle assemblies 34 that will be shown in detail in FIG. 17. Parts 36D, 36E and 36G are parts of the drive axle assemblies 36. The parts that make up a drive axle assembly will be shown in FIG. 18. FIG. 5A and FIG. 5B are zoomed in close-ups of FIG. 5C. The teeth of the small sprocket 38E shown in FIG. 5A and FIG. 5B, in the sprocket idle-lock mechanism (SILM) 38, only mesh with the outside links of the duplex roller chains 32. FIG. 5A shows how this allows the wave spool 30 and each pair of supporting SILMs 38 to pass sprockets 34F and 36E without sprocket tooth interference. The rollers of the SILM 38H (FIG. 6) provide support as they are conveyed past idler and drive rollers 34E and 36G.

PART NUMBER INDEX FOR FIG. 6

38 magnetic sprocket idle-lock mechanism (SILM)
38A outside housing plate
38B spring
38C slide bearings
38D iron containing lock bolt with surface B (brake)
38E sprocket-axle with surface A (brake)
38F inside housing plate
38G roller bearings
38H roller wheels with roller bearings
38I axles for roller wheels
38J bolts
38K housing for roller bearing
38L roller bearing for wave spool axle 30A3
52 magnets FIG. 6 shows the internal parts of magnetic sprocket idle-lock mechanism 38. The functions of a similar device were first explained in U.S. patent application Ser. No. 13/421,224 filed Mar. 15, 2012. A similar device was also described in U.S. Provisional Patent Application Ser. No. 61/242,938 filed Sep. 16, 2009. It was also explained in International PCT Patent Application Serial No. PCT/US10/48859 filed on Sep. 15, 2010. The Magnetic SILM 38 was designed to not only meet the basic requirements of a non-automated conveyer, but also to function in automation to accommodate for variations in water wave period.

The magnetic sprocket idle-lock mechanism (SILM) 38 is designed to operate with magnets to accommodate variations in wave period. FIG. 6 shows an exploded isometric view of a magnetic SILM 38. The outside housing plate 38A has holes to accommodate the axles for the roller wheels 38I. Both the outside housing plate 38A and the inside housing plate 38F have flattened holes for the axles for the rollers 38I. The rollers 38H contain roller bearings so that they turn freely upon their axles 38I. These roller axles 38I will be rigidly fixed to both the outside housing plate 38A and the inside housing plate 38F. Both housing plates 38A and 38F also have round holes to house the roller bearings 38G for the axle of the sprocket-axle and brake 38E. The outside housing plate 38A will also serve as retention plate for the spring 30B. The outside housing plate 38A will also have two mounted tracks labeled C in FIG. 6. Slide bearings 38C will fit into the iron lock bolt 38D. The iron lock bolt 38D will be made of iron, steel or some other iron containing material. Whether it is pulled by the magnet 52 or pushed by the spring 38B, the iron lock bolt will slide freely on the tracks labeled C on 38A in FIG. 6. Bearing 38M will need to accommodate both sliding and rotational motion between the sprocket-axle and brake 38E and the iron lock bolt and brake 38D. The three types of bearings of both SILMs 38 and 40 will be shown in FIG. 10. Both parts 38E and 38D have circular tonge and groove like surfaces labeled A and B in FIG. 6. In the absence of a strong enough magnetic field, spring 38B holds parts 38E and 38D locked together. When in a locked together position with iron lock bolt 38D, the sprocket-axle and brake 38E is locked and prevented from rotating by the tracks labeled C on 38A. In the presence of a strong enough magnetic field, the iron lock bolt 38D will disengage from the sprocket-axle with brake 38E leaving 38E free to turn as the duplex roller chains 32 pass through the idling SILM 38. In the absence of a strong enough magnetic field, each wave spool assembly 30 will move along with the pair of conveying duplex roller chains 32. The roller bearing 38L allows the wave spool axle 30A3 from FIG. 1, FIG. 2, FIG. 3 and FIG. 4, to turn freely as the wave spools 30 drive the duplex roller chains 32 around the conveyer system or WECM. This larger roller bearing 38L can be housed by 38K bolted onto inside housing plate 38F by four bolts 38J.

PART NUMBER INDEX FOR FIG. 7

38 magnetic sprocket idle-lock mechanism
38A outside housing plate with tracks pins C
38B spring
38C slide bearings
38D iron lock bolt with surface B (brake)
38E sprocket-axle with surface A (brake)
38F inside housing plate
38G roller bearings
38M rotational and slide bearing
52 magnet FIG. 7A is an isometric view of a fully assembled magnetic sprocket idle-lock mechanism (SILM) 38. It shows the plain of intersection for the cutaway top view for FIG. 7B and FIG. 7C. FIG. 7B shows the magnetic SILM 38 in an unlocked, idling position caused by the magnetic field of a magnet 52. The magnetic field is acting upon the iron atoms of the iron lock bolt 38D causing the spring 38B to compress completely. In FIG. 7B the interlocking surfaces of 38E and 38D (labeled A and B) are separated, and the sprocket-axle and brake 38E is free to rotate. Of course the magnet 52 and spring 38B must be chosen to have the proper strength and spring constant for the magnetic SILM 38 to work. The spring 38B must be strong enough to keep the interlocking parts of 38D and 38E (A and B) engaged in the absence of the magnetic field from magnet 52 as shown in FIG. 7C. The spring 38B must be weak enough compared to the strength of the magnet 52 to for locked surfaces AB in FIG. 7C to separate as A and B in FIG. 7B where the magnetic field is close enough to cause this positioning to happen. Note the appropriate locations of the slider bearings 38C, housed by the iron lock bolt 38, and surrounding the track pins (labeled C) of the outside housing plate 38A.

PART NUMBER INDEX FOR FIG. 8

40 non-magnetic sprocket idle-lock mechanism (SILM)
40A outside housing plate with tracks C
40B spring
40C slide bearings for tracks C on 40A
40D slide bearings for tracks D on 40F
40E slide and rotational bearing
40F lock bolt with surface B and tracks D
40G sprocket-axle with surface A
40H inside housing plate
40I roller bearings for 40G
40J roller wheels with roller bearings
40K axles for roller wheels
40L bolts
40M spacer sheaths for bolts
40N roller bearing for wave spool axle 30A3
40P mechanical lever assembly An alternative to the magnetic SILM 38 that was detailed in FIG. 6 and FIG. 7 is shown in FIG. 8. FIG. 8 is an exploded isometric view of the mechanically levered sprocket idle-lock mechanism (mechanically levered SILM) 40. It is similar in many ways to the magnetic SILM 38 but uses a mechanical lever assembly 40P instead of a magnet 52 to perform the same function. The roller bearing 40N, to provide rotatable support to the wave spool axle 30A3 is housed differently from the magnetic SILM 38 in FIG. 6 and FIG. 7. The inside housing plate 40A extends farther upward to help support the roller bearing 40N for the wave spool axle 30A3. The four retaining bolts 40L run through sheaths 40M that serve as cross members between housing plates 40A and 40H. Either the housing method shown in FIG. 6, or the housing method shown in FIG. 8 could be used to support a roller bearing (40N or 38L) for the wave spool axle 30A3 for either type of SILM (38 or 40). The lock bolt 40F has tracks D that attach to the mechanical lever assembly 40P. The outside housing plate 40A has holes to house slider bearings 40D for the tracks C of 40F. In the non-magnetic SILM 40, the sliding tracks D of 40F, along with slide bearings 40D, housing holes in 40A, and part assembly 40P replace the magnet 52 needed for the magnetic SILM 38 of FIG. 6. The mechanical lever part assembly 40P will be shown and elaborated upon in FIG. 11 and FIG. 12.

PART NUMBER INDEX FOR FIG. 9

40 mechanically levered sprocket idle-lock mechanism SILM
40A outside housing plate
40B spring
40D slide bearings for track pins D on 40F
40E slide and rotational bearing
40F lock bolt with surface B and track pins D
40G sprocket-axle with surface A
40H inside housing plate
40I roller bearings for 40G
40N roller bearing for wave spool axle 30A3
40P mechanical lever assembly FIG. 9A shows the assembled non-magnetic sprocket idle-lock mechanism 40 with the plane intersection and perspective for cutaway side views FIG. 9B and FIG. 9C. FIG. 9B shows the inside of a non-magnetic SILM 40 in a locked position. When the mechanical lever assembly 40P is not being pulled, the spring 40B keeps the lock bolt 40F with surface B locked onto surface A on the sprocket-axle 40G. The mechanical lever assembly 40P will be shown in detail in FIG. 11. FIG. 9C shows the non-magnetic SILM 40 in an idling position. When the mechanical lever assembly is pulled it pulls the pin tracks D of the lock bolt 40F partially though the slide bearings 40D and their holes in the outside housing plate 40A. Surfaces A and B are disengaged and the sprocket-axle with surface B is free to rotate.

FIG. 10 shows three types of bearings and the type of rod or rail that they roll upon to reduce friction. Both the magnetic SILM 38 and the non-magnetic SILM 40 utilize all of the parts shown in FIG. 10. Roller bearings are designed to reduce friction in rotational motion only. FIG. 10A is a roller bearing that is designed to fit upon a cylindrical rod FIG. 10B. Parts 38G and 38L in FIG. 6 and FIG. 7 are roller bearings. Parts 40I and 40N FIG. 8 and FIG. 9 are also roller bearings. The wheels of the magnetic SILM 38H along with the wheels of the non-magnetic SILM 40J are equipped with roller bearings. Roller bearings are also utilized in the idler axle assembly 34 detailed in FIG. 17 and the drive axle assembly 36 detailed in FIG. 18.

FIG. 10C shows a slide bearing and FIG. 10D shows the track it is designed to slide upon. Parts 38C in FIG. 6 and parts 40C and 40D in FIG. 8 are all slide bearings. Slide bearings reduce friction between parts where transitional motion is required.

FIG. 10E is a special type of bearing to accommodate low friction motion in both rotation and sliding. The rows of ball-bearings in FIG. 10E could accomplish this on a cylindrical rod FIG. 10F. Part 38M in FIG. 6 and part 40E in FIG. 8 are this special type of bearing. Given that the holes in 38D and 40G are large enough to house these bearings 38M and 40E; these holes are also large enough to accommodate clearance for sprocket-axles 38E and 40G. Both SILMs 38 and 40 may prove to work just fine if these bearings 38M and 40E were eliminated.

PART NUMBER INDEX FOR FIG. 11

Figure 12:
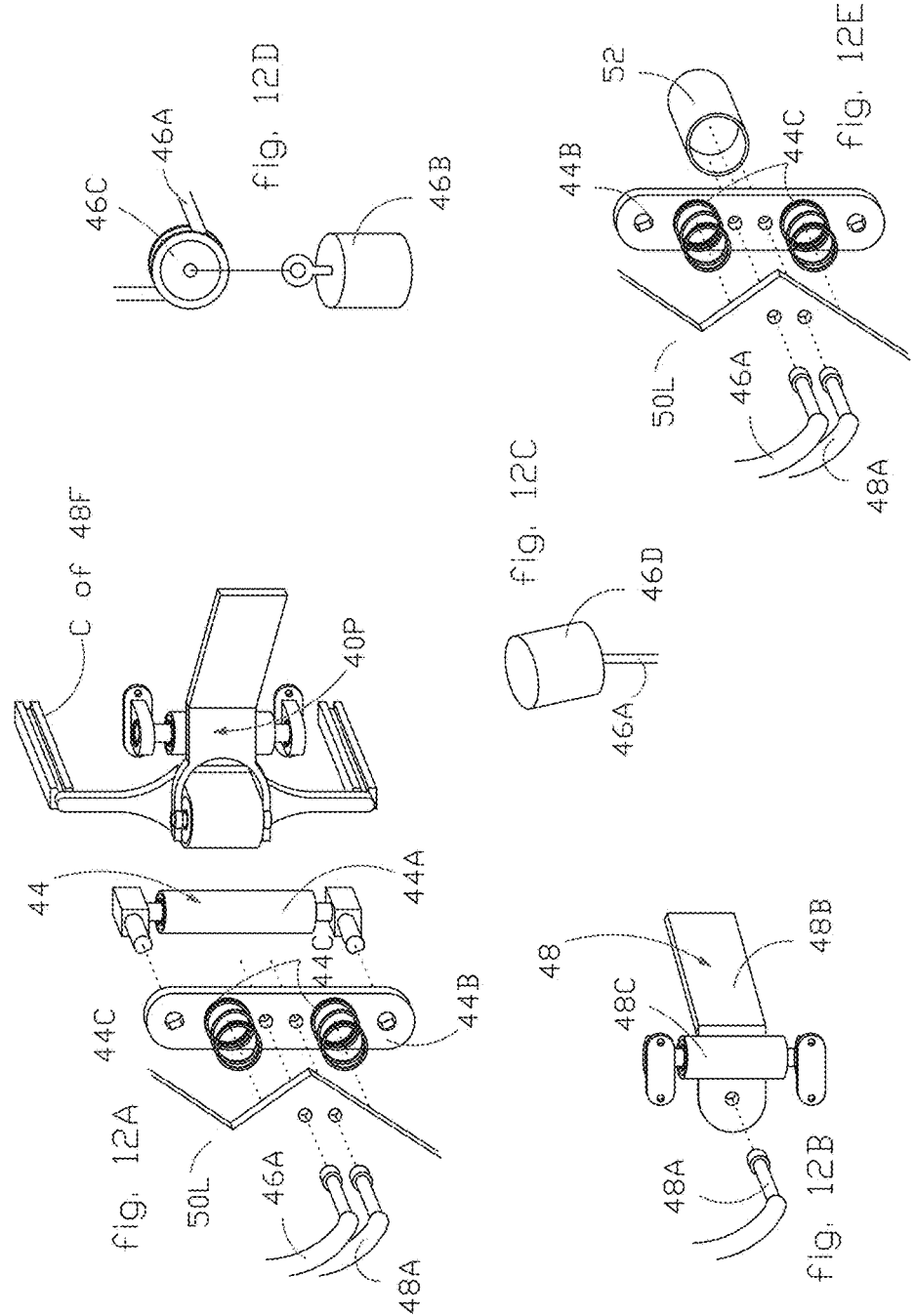
FIG. 12 shows some additional parts needed for either type of automation.

40 mechanically levered sprocket idle-lock mechanism SILM
40A cutaway surface of outside housing plate with tracks pins C
40B spring 40C slide bearings for C on outside housing plate
40D slide bearings for track pins D on 40F
40E slide and rotational bearing (an optional part)
40F lock bolt with surface B and track pins D
40G sprocket-axle with surface A
40I roller bearing mounted into 40A
40P mechanical lever assembly
40P1 angled lever
40P2 pivoting connection to tracks with roller bearing and axle
40P3 fulcrum with roller bearing axle and mounts to 40A
44 lever trigger part assembly (detailed in FIG. 12)

Because the mechanical lever assembly 40P is small compared to the outside housing plate 40A of the nonmagnetic SILM, FIG. 11B and FIG. 11C show part of the outside housing plate 40A broken away to show parts hidden behind it. FIG. 11A shows the assembled mechanically levered SILM 40 with the mechanical lever assembly 40P labeled to give the viewer perspective of what FIG. 11B and FIG. 11C represent. FIG. 11B shows the mechanically levered SILM 40 in a locked position. The spring 40B has the lock bolt 40F pushed into the sprocket-axle 40G. The surfaces A and B (shown in FIG. 8 and FIG. 9) of 40F and 40G are locked together in FIG. 11B. FIG. 11C shows the nonmagnetic SILM 40 in an idling position. As the mechanically levered SILM 40 moves a little farther from right (FIG. 11B) to left (FIG. 11C), the angled lever 40P1 is caused to rotate over the fulcrum with roller bearing axle and mounts 40P3 by trigger assembly 44, pulling the lock bolt 40F, by its tracks C, toward the viewer and further compressing spring 40B. The part of the lever trigger part assembly 44 in FIG. 11B and FIG. 11C is stationary. It is the mechanically levered SILM 40 that is being moved along by the duplex chain 32 in the WECM. In FIG. 11C the spring 40B is further compressed and 40F and 40G and the surfaces A and B are no longer interlocked. This leaves the sprocket-axle 40G free to turn as the duplex chain 32 pass though the idling nonmagnetic SILMs 40. When the lever trigger assembly 44 is pulled away (FIG. 12), the nonmagnetic SILM 40 returns to locked position shown in FIG. 11B and the associated wave spool 30 continues to ride with the WECM. This process, along with other methods of automation to accommodate for variations in wave period will be shown and explained in this document and the figures that follow.

PART NUMBER INDEX FOR FIG. 12

40P mechanical lever assembly
44A contact roller bearing
44B contact roller bearing lever and bracket
44C fulcrum roller bearing with mounting brackets
44D springs
46A pull cable to buoy
46B pulley anchor
46C pulley
46D buoy
48 lever trigger assembly
48A cable to lever trigger assembly
48B trigger lever
48C roller bearing fulcrum and mounting brackets
50L part of the surface of left supporting wall (FIG. 19)
52 magnet
56A cable to trigger pull
56B trigger pull lever
56C trigger pull fulcrum and mounting brackets FIG. 12 shows parts that are needed for automation to time each wave spool 30 to be in the right place on the WECM to meet the next approaching wave. FIG. 12A shows the parts of the lever trigger assembly 44. When either of the pull cables 46A or 48A pull the bracket 44B toward the support wall 50L, the springs 44C are compressed. This pulls the contact roller bearing 44A out of reach the lever 44P. The pull cables 46A and 48A are like those used on a car hood release or hand brakes on a bicycle. FIG. 12B shows the parts of the cable pull lever trigger 48. These part assemblies 48 will be mounted to the support walls 50L and 50R (FIG. 19 and FIG. 20) in a location along the bottom of the WECM where it is triggered by a passing wave spool 30 or SILM 38 or 40. Each time either pull cable 46A or 48A is pulled, a wave spool 30 and its associated SILMs 38 or 40 is changed from an idling position to a locked position. In a locked position the wave spool 30 is locked onto the duplex roller chain 32 by its associated pair of SILMs 38 or 40 and rides along with the WECM.

The other pull cable 46A runs around and anchored pulley 46B and 46C on the bottom of the ocean and up to a buoy 46D. These parts are shown in FIG. 12C and FIG. 12D. The buoy 46D will be floating at a distance such that a wave approaching the WECM will cause the buoy 46D to bob up and lock a wave spool onto the WECM to meet an approaching wave. When no wave is present or large enough to trigger the buoy 46D, the trigger lever 48 will be pulled in time to ensure that a wave spool 30 is already in the water waiting for the next approaching wave. With this system waves that are closely spaced will be better harnessed by more wave spools in their path. This also decreases the chances of a wave spool 30 being dragged through the water by another wave spool that is riding with a wave.

FIG. 12E shows the similar equivalent mechanism for the magnetic SILM 38. Here the proximity of the magnet 52 is changed by either pull cables 46A or 48A action.

Some of the locations of the parts in FIG. 12 will be explained with FIG. 14 and FIG. 15.

PART NUMBER INDEX FOR FIG. 13

Figure 13:
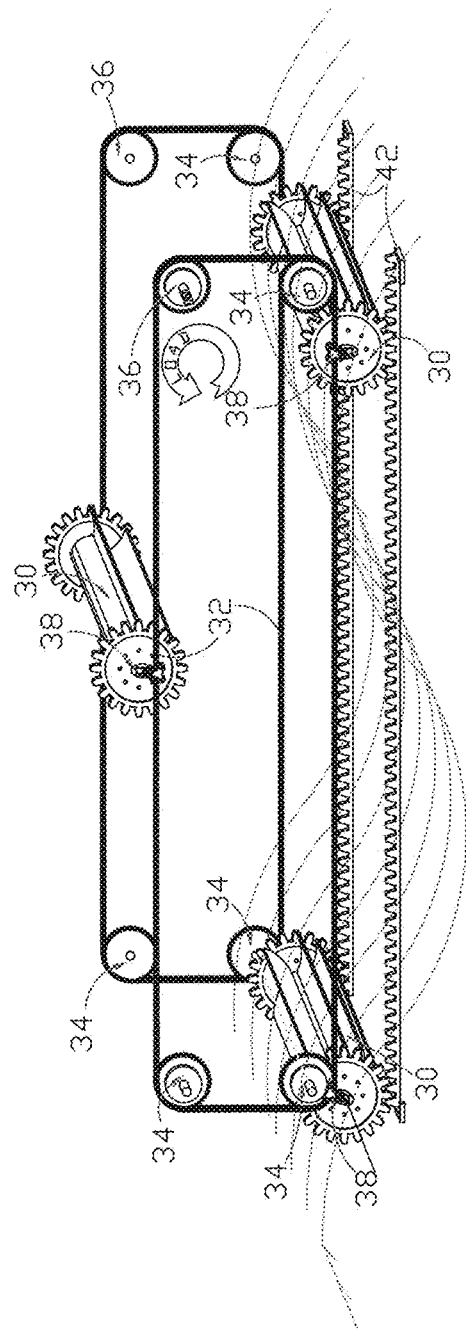
FIG. 13 shows a non-automated version of the conveyor system.

30 wave spool assembly
32 duplex roller chains
34 parts of the idler axle assembly (FIG. 17)
36 parts of the drive axle assembly (FIG. 18)
38 magnetic sprocket idle-lock mechanism (FIG. 6 and FIG. 7)
42 rack gears FIG. 13 shows an incomplete cut-away view of a non-automated version of the conveyor system or wave energy conveyor mechanism (WECM). All of the parts shown will be supported by other parts shown in figures that follow. As waves travel from left to right they will turn the wave spools 30 in a clockwise direction. The "LOAD" shown in FIG. 4 is the force required to drive the WECM in a counter-clockwise direction in FIG. 13. The pair of duplex chains 32 transfer the "LOAD" to around six separate idler axle assemblies 34 and two drive axle assemblies 36. The idler axle assemblies 34 are to provide low friction support to the WECM. The idler axle assembly is detailed in FIG. 17. What is left of this "LOAD" is then transferred though the drive axle assemblies 36 where it is harnessed for some usable purpose. This "LOAD" could be the torque required to drive an electric generator or pump. The drive axle assembly 36 is detailed in FIG. 18. Although only one drive axle assembly 36 is needed for functionality, two are included in these examples for the sake of bilateral symmetry.

PART NUMBER INDEX FOR FIG. 14

Figure 14:
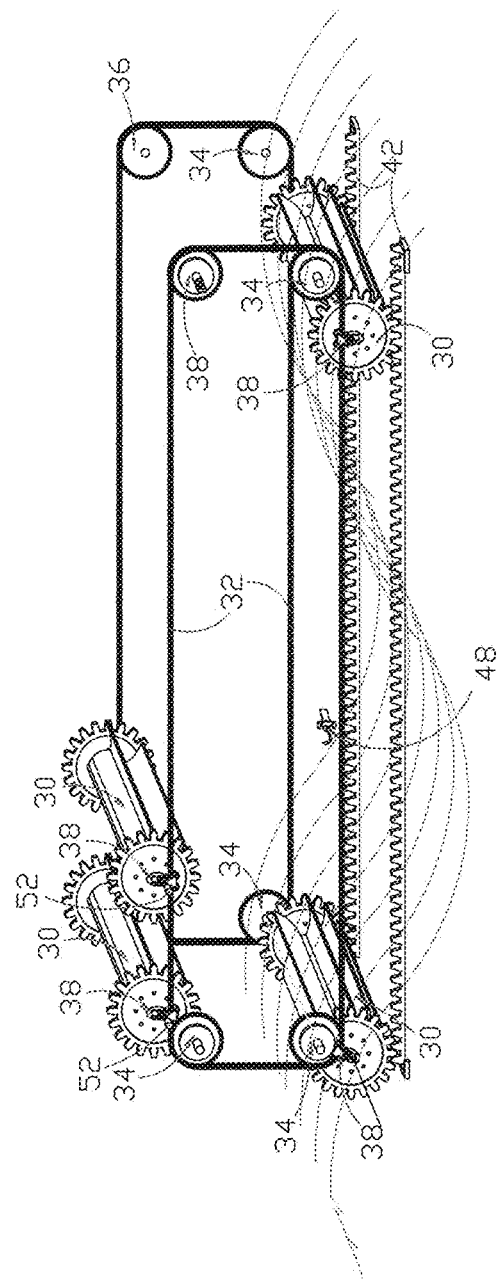
FIG. 14 shows an automated version of the conveyor system using magnets 52 and the magnetic sprocket idle-locking mechanism (SILM) 38.
Figure 18:
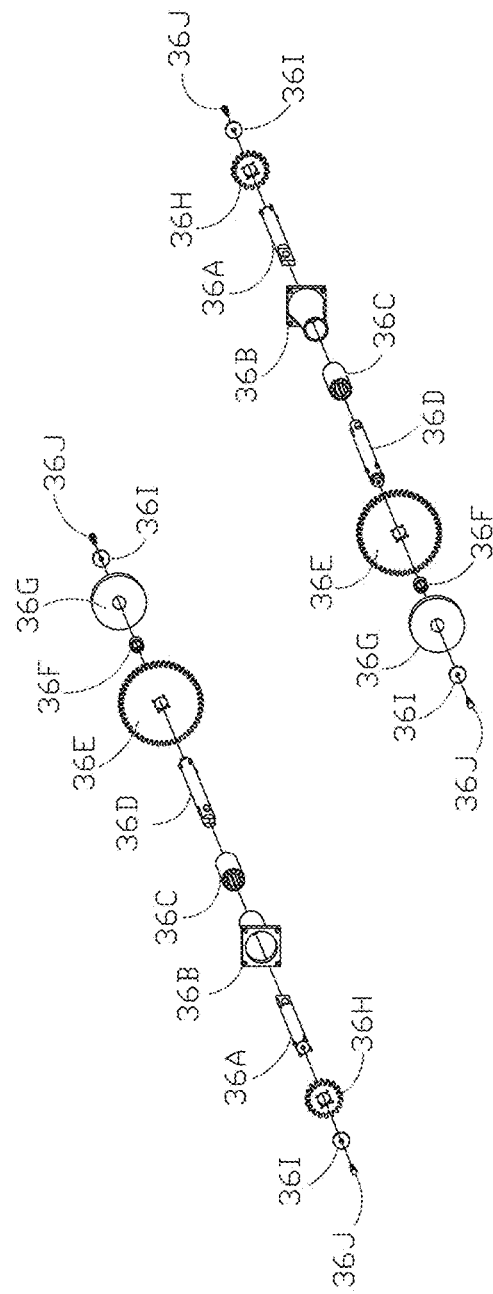
FIG. 18 shows the parts of the drive axle assemblies 36.
Figure 19:
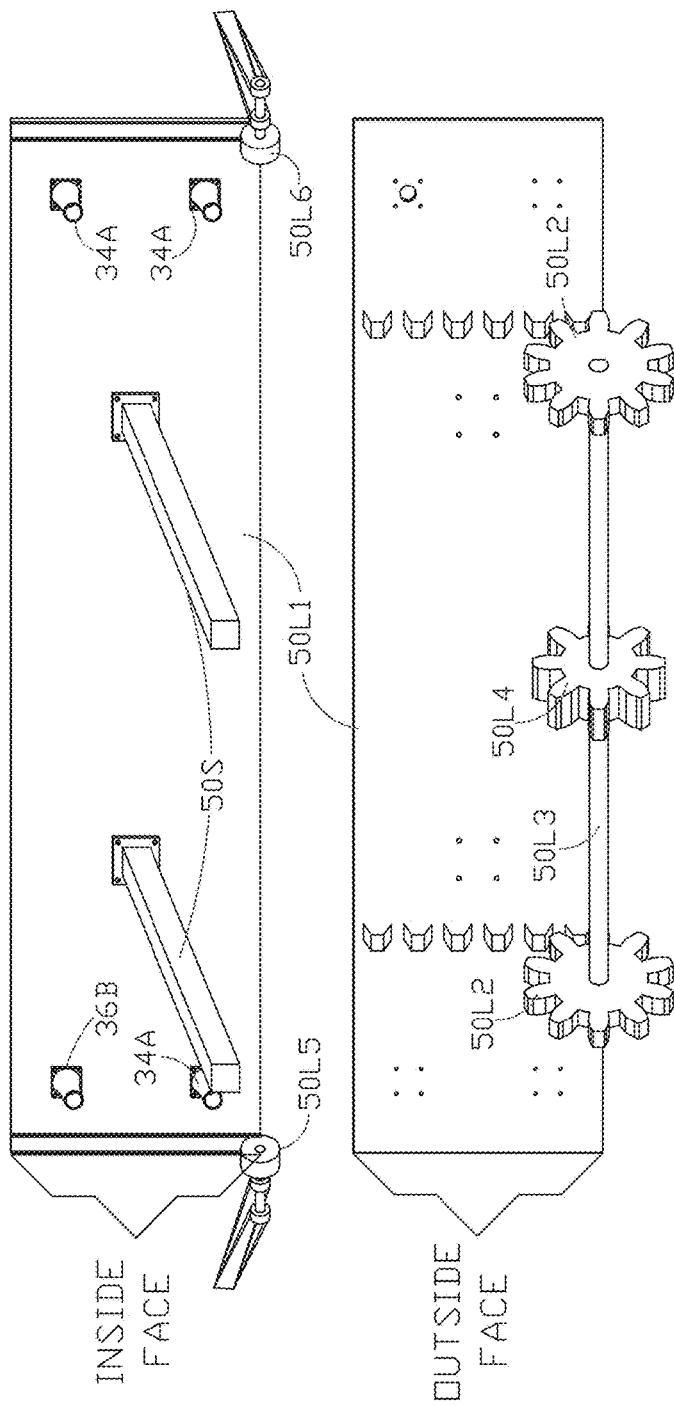
FIG. 19 shows both the inside, and outside view of the left wall assembly 50L that supports the left side of the WECM.
Figure 20:
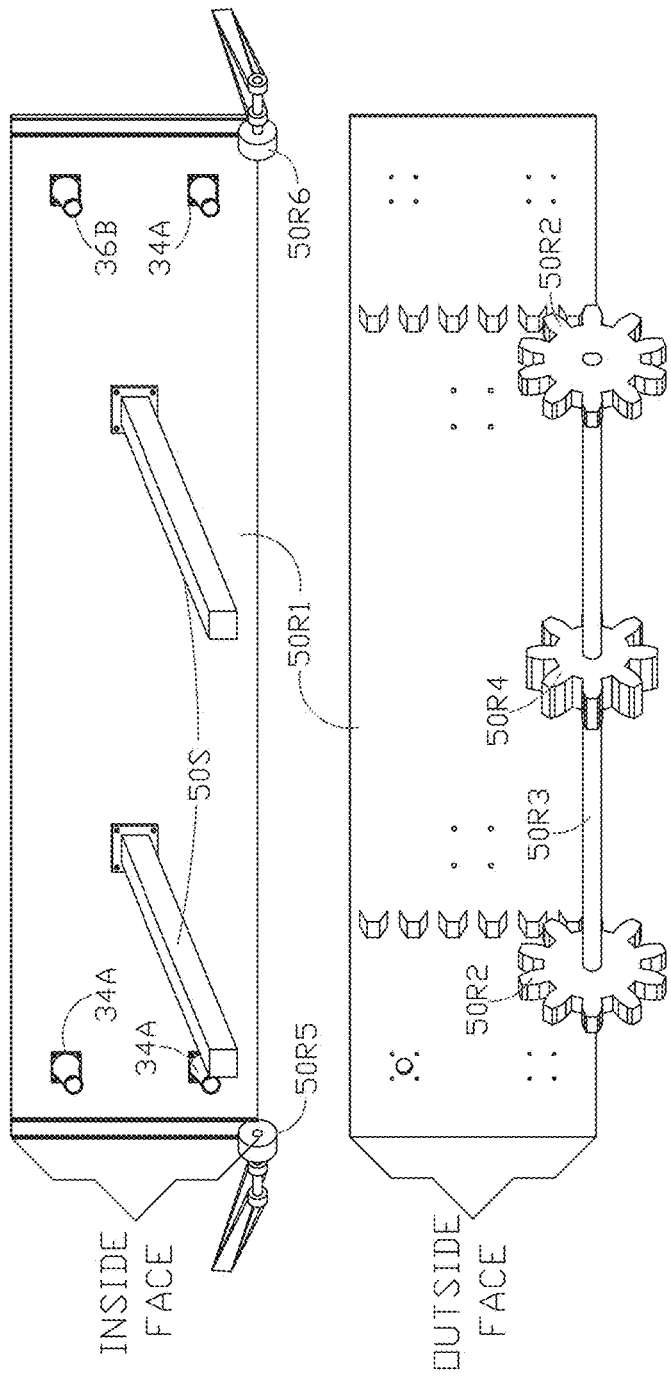
FIG. 20 shows both the inside, and outside view of the right wall 50R that supports the right side of the WECM.

30 wave spool assembly
32 duplex roller chains 34 parts of the idler axle assembly (FIG. 17)
36 parts of the drive axle assembly (FIG. 18)
38 magnetic sprocket idle-lock mechanisms (FIG. 6 and FIG. 7)
42 rack gears
52 magnets FIG. 14 shows one option for an automated wave energy conveyor mechanism WECM. A pair of rack gears 42, as in FIG. 13 will be added to each side of the wave energy collection mechanism (WECM). The two rack gears 42 will be solidly attached to support walls 50LA and 50RA. The left support wall assembly 50L and its parts are shown in FIG. 19. The right support wall 50R and its parts are shown in FIG. 20. This automated WECM uses the magnetic SILM 38 and magnets 52. A lever trigger assembly 48 is placed to be triggered by each passing wave spool 30 as it passes while being driven by a wave. The buoy 46D is not shown in FIG. 14. It would be in the water to the left of the drawing, just out of the view of FIG. 14. In practice, many electrical and/or electronic controls could work along with these mechanical and magnetic mechanisms and may be focused upon in further experimentation and future applications.

A pair of links of chain under tension and a pair of sprockets could be used in place of the spur gears 30A1 and rack gears 42 shown in these drawings. Belts and pulleys could also be used in place of the duplex roller chains 32 and sprockets 34F and 36E as well.

PART NUMBER INDEX FOR FIG. 15

Figure 15:
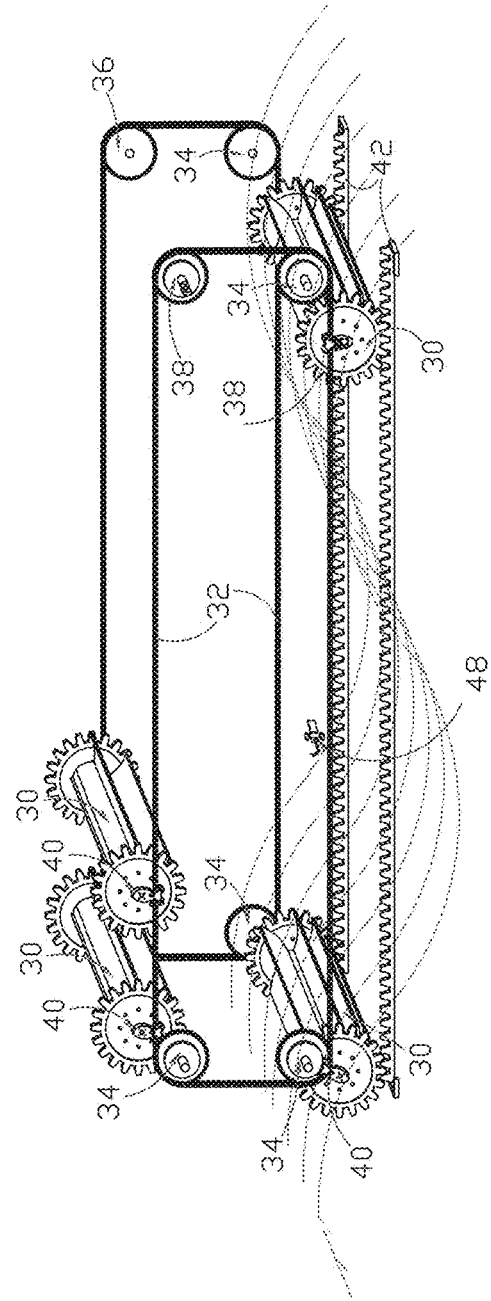
FIG. 15 shows an automated version of the conveyor system using trigger system 44 and the mechanically levered sprocket idle-lock mechanism 40.

30 wave spool assembly
32 duplex roller chains
34 parts of an idler axle assembly (FIG. 17)
36 parts of a drive axle assembly (FIG. 18)
40 levered sprocket idle-lock mechanism
42 rack gears FIG. 15 shows an automated version of the WECM using the mechanically levered SILM 40. As in the automated version of the WECM shown in FIG. 14, the buoy trigger system 46 from FIG. 12 is not depicted in FIG. 15. The buoy trigger system 46 is to the left of FIG. 14 and FIG. 15, in the approaching waves. FIG. 14 and FIG. 15 only differ in the type of SILM used (FIG. 6-FIG. 12).

PARTS NUMBER INDEX FOR FIG. 16

Figure 16:
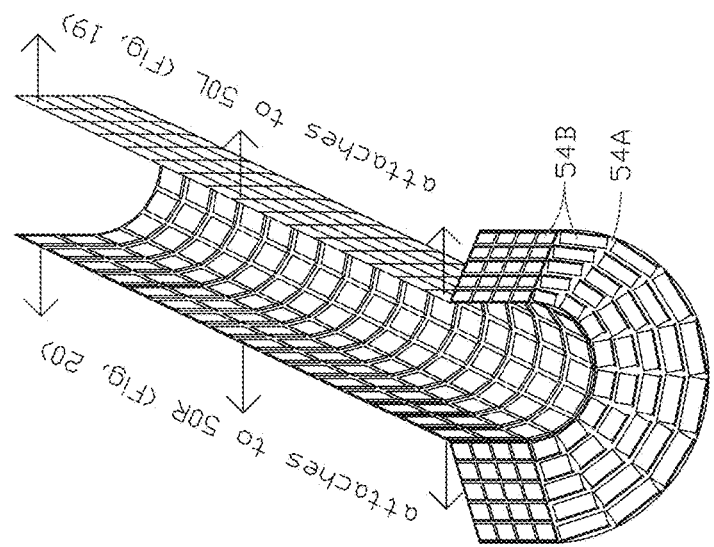
FIG. 16 shows the optional wave enhancement channel.

54 wave enhancement channel
54A wave enhancement channel frame
54B wave enhancement channel one way flap valves FIG. 16 shows the wave enhancement channel assembly 54. This part assembly could be rigidly attached to the supporting walls of the WECM 50. The WECM would be situated along the length of, and inside of the wave enhancement channel assembly 54. As its name implies, the wave enhancement channel 50 is designed to increase the amplitude of water waves inside of itself where the WECM is harnessing the rotational motion of water waves to turn the two part drive axle 36A and 36D. The wave enhancement channel consists of a frame 54A with an array of holes to accommodate and array of one way valves 54B. The exact shape of the frame of the wave enhancement channel 54A may differ from what is depicted in FIG. 16.

The lower left end of the image of the wave enhancement channel 54 depicted in FIG. 16 shows how it's shape curves outward to guide approaching waves through a narrowed channel. This idea is not unique to this embodiment and has been shown to enhance wave amplitude. The Wave Dragon, put into use to generate electricity in the North Sea, off the coast of Denmark has been using the idea of guiding waves to a narrowing ramp or channel to increase wave amplitude for over a decade now. The Wave Dragon harnesses the potential energy of water that has been pooled above sea level by waves that have been guided by wave reflectors to slosh over a wall. This pooled reservoir of water turns turbines as it drains back to sea level.

The wave enhancement channel 54 in FIG. 19 is unique in that it uses an array of one way valves 54B to allow water to enter to feed the wave as it enters and passes through the channel 54, while preventing water from leaving the confines of the channel 54.

Other water wave energy capturing inventions may benefit from using the wave enhancement channel 54 to increase the amplitude of waves where their energy is being harnessed. The Pelamis the Aquabuoy or any other device that collects the energy of a buoyant object riding over passing waves could gather more energy from bigger waves.

PARTS NUMBER INDEX FOR FIG. 17

Figure 11:
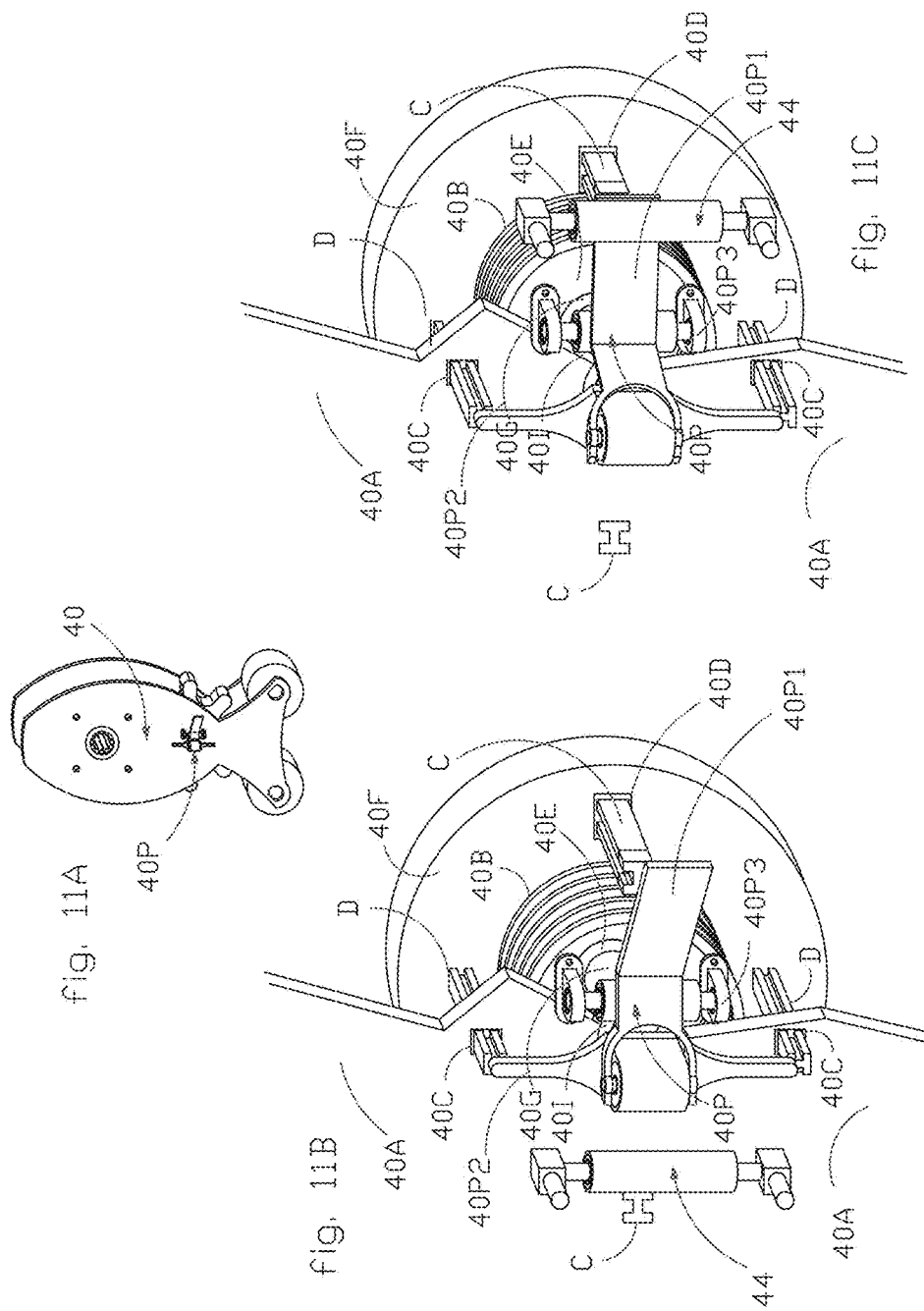
FIG. 11 shows an isometric view of the lever system 40P of the mechanically levered sprocket idle-lock mechanism (SILM) 40.
Figure 17:
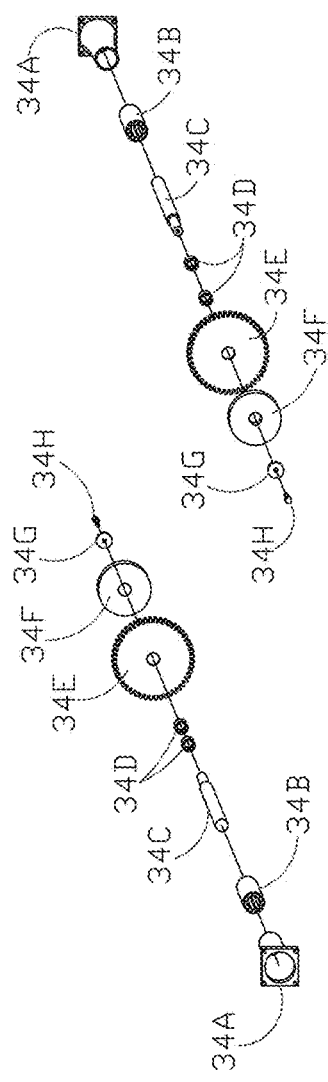
FIG. 17 shows the parts of the idler axle assemblies 34.

34 idler axle assembli
34A idler axle collar (to 34L or 34R; FIG. 11 and FIG. 12)
34B idler collar axle bearing (a roller bearing)
34C idler axle
34D bearings for idler sprocket and roller (roller bearings)
34E idler sprocket
34F idler bypass roller
34G retention plate
34H bolt FIG. 17 shows the parts of the idler axle assemblies 34. The function of the idler axle assembles 34 is to provide rotatable, low friction support for the pair of duplex roller chains 32. Each collar 34A will be solidly attached to the WECM supporting wall 50L or 50R on the appropriate side. This collar 34A will house a roller bearing 34B to provide low friction rotation for the idler axle 34C if there is ever enough torque upon it to turn. Another pair of roller bearings 34D provide low friction the idler sprocket 34E and the idler bypass roller 34F. The idler bypass roller 34F could be held in place by its bearing 34D, a retention plate 34G and a bolt 34H.

PARTS NUMBER INDEX FOR FIG. 18

36 drive sprocket assembly
36A outside drive sprocket axle
36B drive sprocket axle collar (to 34L or 34R; FIG. 19 and FIG. 20)
36C drive collar axle bearing
36D inside drive sprocket axle
36E drive sprocket
36F bearing for bypass roller
36G retention plate
36H drive to transmission sprocket
36I retention plates
36J bolts FIG. 18 shows the parts of a drive axle assembly 36. Two of the eight sprockets shown in FIG. 5, FIG. 13, FIG. 14 and FIG. 15 are part of drive axle assemblies 36. Only one drive axle assembly 36 is necessary for the wave energy extracted from the waves by the WECM to be harnessed in a useful manner. Unlike the idler axle assemblies 34, each drive axle assembly 36 will pass though the supporting walls 50L or 50R to drive a transmission. Both sprockets 36E and 36H will be attached to the connected drive axle 36A and 36D.

A sprocket 36H could drive a transmission that drives a generator or mechanical device. A transmission, generator, pump or whatever other mechanical device that these methods of wave energy conversion drive will consist of appropriate known technology and are outside the scope of the present embodiment. The drive axle 36A and 36D consists of two separate parts. This allows each drive axle assembly 36 or assemblies 36 to be separated when not in use. This allows for the supporting walls 50 (FIG. 19 and FIG. 20) to be raised, lifting the WECM up out of the water.

PARTS NUMBER INDEX FOR FIG. 19 AND FIG. 20

34A idler axle collars
36B drive axle collar
50 the entire WECM support assembly
50L entire left support wall part assembly
50L1 left support wall of WECM
50L2 gears to move support wall 50L1
50L3 axle for gears 50L2 and 50L4
50L4 gear driven by a transmission and motor (not shown)
50L5 left front track roller and bracket
50L6 left rear track roller and bracket
50R entire right support wall part assembly
50R1 right support wall of WECM
50R2 gears to move support wall 50R1
50R3 axle for gears 50R2 and 50R4
50R4 gear driven by a transmission and motor (not shown)
50R5 right rear track roller and bracket
50R6 right front track roller and bracket
50S cross members for support walls 50L and 50R FIG. 19 and FIG. 20 show the supporting walls of the WECM and many associated parts. FIG. 20 is a mirror image of FIG. 19 and vice versa. A view of the inside and outside of both the left and right support walls 50L1 and 50R1 are shown in FIG. 19 and FIG. 20. These two walls 50L1 and 50R1 are connected by cross members 50S and will be the support of the WECM. Cross members 50S will pass between the duplex roller chains 32 of the WECM as to not interfere with the motion of the wave spool assemblies 30 or any other machinery. The support walls 50L and 50R, cross members 50S will allow the WECM to be moved up and out of the water. The gears 50L2 and 50R2 mesh with the sets rack gear teeth outside face of both support walls 50L1 and 50R1. In FIG. 19 and FIG. 20 gears 50L2 and 50R2, driven by gears 50L4 and 50R4 via axles 50L3 and 50R3 move the support walls 50L1 and 50R1 vertically, up out of the water, or down into the water. The gears 50L4 and 50R4 are driven by a reversible transmission and motor (not illustrated). The inside faces of 50L1 and 50R1 have tracks on the front and back ends to accommodate bracketed rollers 50L5, 50L6, 50R5 and 50R6 to keep the walls 50L1 and 50R1 plumb as they are moved. The position of the gears 50L2, 50L4, 50R2 and 50R2, axles 50L3 and 50R3 and bracketed rollers 50L5, 50L6, 50R5 and 50R6 at the bottom of support walls 50L1 and 50R1 indicate that the entire support assembly 50 in both FIG. 19 and FIG. 20, can be lifted up and out of the water. The inside parts of the drive axles 36D1 pass through the support walls 50L1 and 50R1 to connect with the outside part of the drive axle 36A. The drive axles 36A and 36D are in two parts to allow separation for the WECM and the entire support assembly 50 to be raised up out of the water. The two options of housing for support of support assembly 50 will also both contain watertight walls running planerly parallel to 50L and 50R.

The optional wave enhancement channel 54 (FIG. 16) could be solidly attached along the bottom of 50L1 and 50R1.

PARTS NUMBER INDEX FOR FIG. 21

Figure 21:
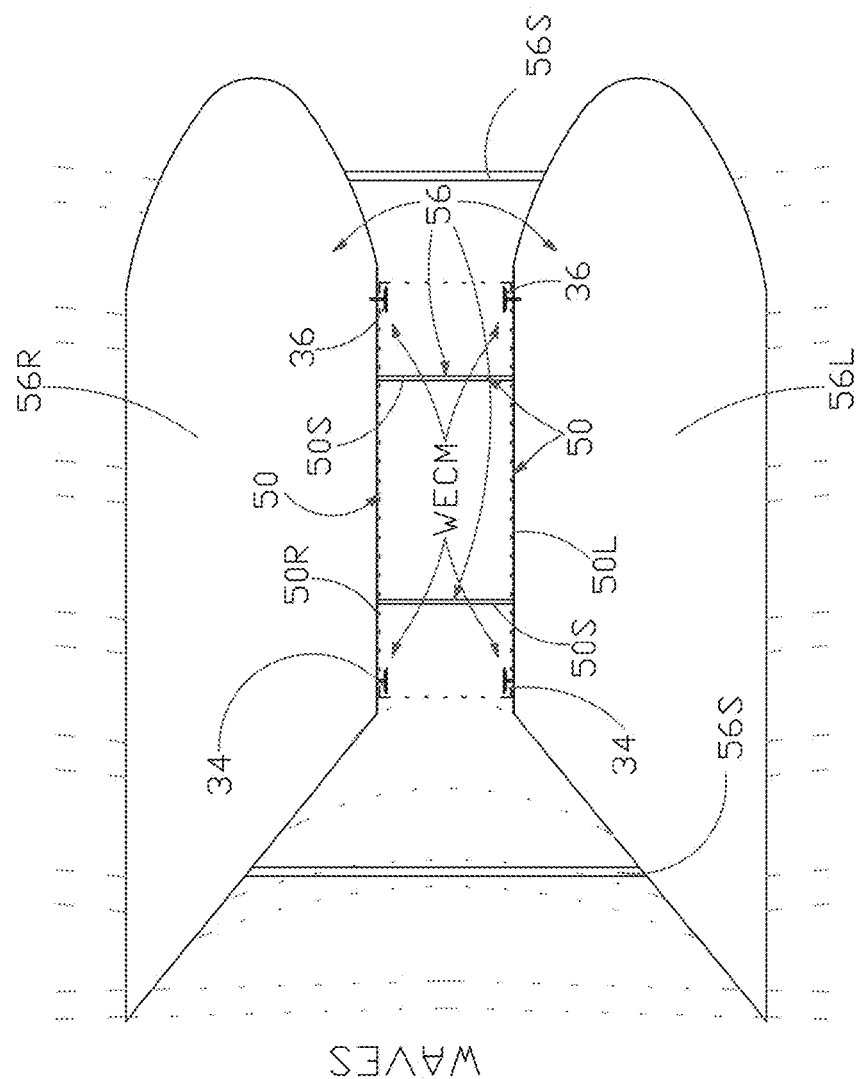
FIG. 21 is a top view of the two hulls 56L and 56R of a double hulled vessel 56 that could be used as a foundation to the supporting walls 50 of the conveyor system.

34 idler axle assemblies
36 drive axle assemblies
50 entire support assembly of the WECM
50L left support wall part assembly
50R right support wall part assembly
50S cross members for support walls 50L and 50R
56 double hulled ship (50L, 50R and 50S)
56L left hull of double hulled ship
56R right hull of double hulled ship
56S cross members for ship hulls 56L and 56R
WECM wave energy collection mechanism FIG. 21 is a top view of the first of two example embodiments providing a foundation for the entire support assembly 50 of the WECM. A flywheel, transmission, electric generator, mechanical pump and all other associated machinery driven by, or otherwise necessary for this invention to be useful and usable could be housed in or upon these hulls 56L and 56R. This buoyant foundation 56 will have the advantages of portability. It may be towed by another boat or ship or could be equipped with its own means of propulsion. It will be able to go where wave conditions are most suitable, where it is most needed and can be assembled away from where it is used. Being portable will also allow the double hulled ship 56 to be moved away from danger; severe storms for example. The direction of wave travel in FIG. 21 will be from left to right. The shape of the two hulls 56L and 56R taper in to the channel between the hulls 56L and 56R, where the WECM is suspended. The optional wave enhancement channel 54 (FIG. 16) could also be suspended between 50L and 50R. The shape of the hulls 50L and 50R may not be straight or angled and shown. It could be customized to fit the shaped of the optional wave enhancement channel 54. The best shape to enhance wave amplitude can be experimentally determined. The left end of the vessel 56 in FIG. 21 will be referred to as the stern of the ship. The right end is more suitable to be the bow as the vessel 56 is being towed or self propelled.

PARTS NUMBER INDEX FOR FIG. 22

Figure 22:
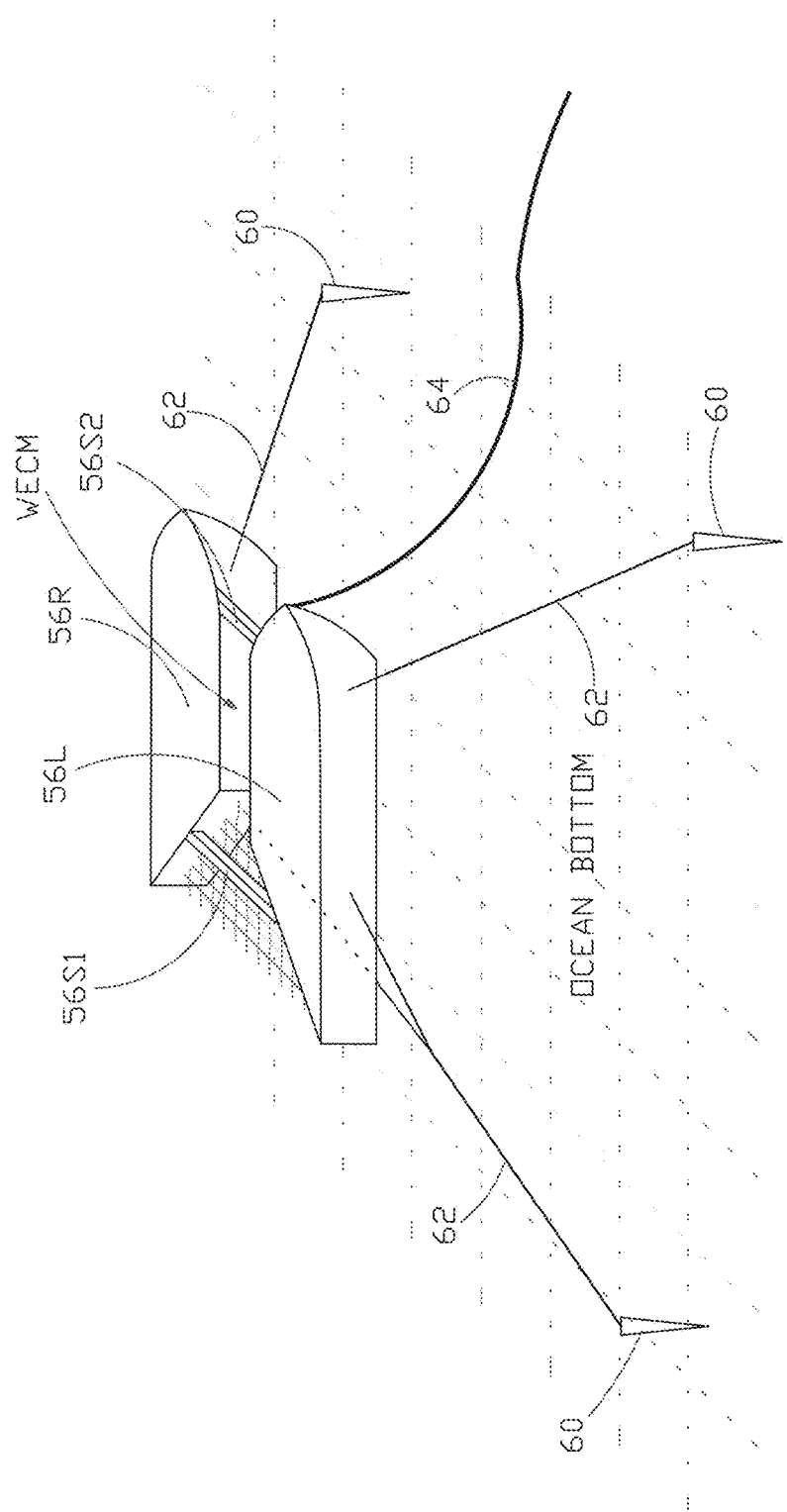
FIG. 22 is an isometric view of the double hulled vessel 56. It also depicts the bored in anchors 60, cables 62 and an underwater electrical cable 64.

56L left ship hull
56R right ship hull
56S cross members
60 bored in anchors
62 cables to anchors
64 undersea electrical cable to shore
WECM wave energy collection mechanism FIG. 22 shows the double hulled ship 56 from an isometric perspective. In order for the WECM to harness the energy from waves as it was designed to do it must maintain a near constant level in relation to the trough line of the waves. The waves must behave as if they were passing between two solid walls as opposed to a buoyant vessel that rides over them. In FIG. 22 three anchors 60 are shown bored into the bottom of the ocean. The cables 62 attaching them to the ship 56 could be equipped with tensioners that act opposite to the buoyant force, keeping the vessel 56 level and acting as a fixed wall. This multiple anchor system 60 and 62 with tension on the anchors 60 is mandatory for the buoyant foundation 56 to enhance wave amplitude and for the WECM to work properly. If what is being powered is at least one electric generator, the undersea electric cable 64 to shore is one of several possible options for an end use if these ideas.

PARTS NUMBER INDEX FOR FIG. 23

50 walls and support assembly of the WECM
66 non-buoyant housing (66L and 66R collectively)
66L left housing
66R right housing
68A top part of vertically adjustable support posts
68B bottom part of vertically adjustable support posts
70 rotational foundation assembly
70A top plate of rotational foundation
70B bottom plate of rotational foundation
70C roller bearing for rotational foundation
72 bottom support posts FIG. 23 shows the second of two possible ways to keep the WECM and its support assembly level with the trough line and facing perpendicular to the oncoming waves. The bottom support posts 72 will be bored into the bottom of the ocean to provide a firm foundation. The bottom support posts 72 are also drawn angled outward radially to provide more stability. Attached above the bottom support posts 72 is the rotational foundation assembly 70. This will allow the housings 66 and the WECM to be turned to the best direction to be perpendicular to most oncoming waves at any given time. The rotational foundation assembly 70 will have the capability to be turned and locked at whatever angle is needed. Many known technologies could be incorporated to fill this need. The vertically adjustable support post assemblies 68 will be connected atop the rotational foundation 70. These posts 68 will provide vertical adjustability to compensate for variations in water depth due to tides. The top sections 68A could overlap the bottom sections 68B in a telescoping manner. Each post assembly 68 could house a threaded bolt, hydrolic piston, worm gear system or any other means of raising or lowering in a jack like manner. This could be powered by a motor. If the housings 66, support assemblies 50, the optional wave enhancement channel 54 and the WECM were collectively, and independently buoyant, the buoyancy and gravity could be used to compensate for changes in water depth. The housings 66L and 66R will support the support assembly 50 that in turn supports the WECM. The housings 66 will also house the transmission, electric generators, pump, personnel or whatever is needed depending upon the end use of this system and method of water wave energy conversion.

The rotation of outside drive axle 36A is expected to be slow and inconsistent, yet very forceful, as waves pass through the WECM. The outside drive axle 36A and transmission drive sprocket 36H will be rotating in a dry and relatively stable environment. Depending upon which of the two preceding methods of support is chosen FIG. 22 or FIG. 23, the outside drive axle 36A and a transmission drive sprocket 36H will be housed by 56L, 56R or 66L, 66R. The slow, jerky, yet forceful rotation of 36A and 36H (FIG. 18) can then be further converted into useful forms of energy.

Possible Uses

Two notable uses of this device are the generation of electricity or to drive a water pump for desalinizing ocean water.

In order to turn the slow, inconsistent, yet forceful torque into the steady faster angular velocity required to drive electric generators, a transmission and dense flywheel of high moment of inertia could be used. Once generated, the electricity could be sent to shore or elsewhere by undersea cable or electromagnetic waves. The generated electricity could also be used to charge batteries at sea.

A mechanical water pump could be driven directly by the outside drive axle 36A without the necessity of a transmission and flywheel. A water pump could be used in the desalinization of ocean water by pumping the ocean water through a filter. A mechanical water pump may also prove useful in the clean up of oil spills.

What is claimed is:

1. A wave spool assembly adapted to be rotationally driven and processed by water waves comprising:
    a core including a slotted cylindrical tube with a plurality of longitudinal slots and further comprising a pair of gear-end plates attached to each end of the slotted cylindrical tube;
    wherein each gear-end plate comprises a central hole that accommodates a central axle of the wave spool assembly, and further comprises a plurality of holes placed radially around the central hole;
    a plurality of curved paddles each with an inside edge and an outside edge, and each having a paddle axle with an axle axis located near the inside edge; wherein each curved paddle is attached to the core at each end of its respective paddle axle by bearings located in the radially placed holes;
    wherein each curved paddle has a limited range of rotation about its axle axis, said range of rotation limited by contact of the inside edge of the paddle with the slot when the outside edge of the paddle has been moved to a maximum distance from the central axle.

2. The wave spool assembly of claim 1, wherein each curved paddle is adapted to open to its maximum distance position by the flow of the water waves to create and maximize torque in an intended direction of rotation and travel, and wherein each curved paddle closes against the other paddles due to the drag of the water opposite to the intended direction of travel to minimize friction against a desired direction of rotation and travel.

3. A wave energy conveyor mechanism (WECM) for converting water wave energy comprising
    a wave spool assembly driven by a water wave and comprising a pair of gear-end plates attached to a central axle of the wave spool assembly and further comprising a plurality of curved paddles attached to the pair of gear end plates at an axle axis and each having a limited range of rotation about its axle axis;
    a pair of supported rack gears engaging the pair of gear-end plates so that rotation of the wave spool assembly by the water waves is converted into forward mechanical motion of the wave spool assembly, causing the wave spool assembly to process in the same direction of travel as the water wave;
    a pair of idle lock mechanisms, wherein the central axle of the wave spool assembly is rotatably attached to the pair of idle lock mechanisms so as to attach the wave spool assembly to a pair of duplex roller chains or belts, wherein the forward motion of the wave spool assembly is transferred by the idle mechanisms to pull a load on the duplex roller chains or belts;
    a plurality of idler axle assemblies that provide low friction support to the WECM;
    at least one drive axle assembly that harnesses the load for a usable purpose.

4. The wave energy conveyor mechanism of claim 3, further comprising an underwater surface serving as a framework for an array of one way valves.

5. The wave energy conveyor mechanism of claim 3, further comprising a buoyant object comprising a water wave channel, wherein the buoyant object supports the wave energy conveyor mechanism and is multiply anchored under tension thus keeping the vessel level with the water surface for the purpose of wave energy collection.

6. The wave energy conveyor mechanism of claim 3, wherein the idler lock mechanisms lock in the absence of a strong magnetic field and idle in the presence of a strong magnetic field.

7. The wave energy conveyor mechanism of claim 3, wherein the idler lock mechanisms lock in the absence of a countering force upon a mechanical spring loaded lever and idle in the presence of a countering force upon the mechanical spring loaded lever.

\* \* \* \* \*